United States Patent
Suzuki et al.

(10) Patent No.: US 7,999,990 B2
(45) Date of Patent: Aug. 16, 2011

(54) OPTICAL ELEMENT, OPTICAL DEVICE, AND DISPLAY DEVICE

(75) Inventors: Kazuhiro Suzuki, Tokyo (JP); Hiroto Honda, Kanagawa-ken (JP); Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 12/408,302

(22) Filed: Mar. 20, 2009

(65) Prior Publication Data
US 2009/0237772 A1   Sep. 24, 2009

(30) Foreign Application Priority Data
Mar. 24, 2008   (JP) ................. 2008-076781

(51) Int. Cl.
G02F 1/00    (2006.01)
G02F 1/03    (2006.01)
G02B 5/04    (2006.01)

(52) U.S. Cl. ........ 359/245; 359/237; 359/831; 359/837; 359/615; 359/558; 359/566

(58) Field of Classification Search .......... 359/558, 359/566, 615, 618, 669, 678, 831, 837; 362/31, 362/222, 223, 225; 348/743, 816; 385/33, 385/36

See application file for complete search history.

(56) References Cited

U.S. PATENT DOCUMENTS

| | | | | |
|---|---|---|---|---|
| 2,302,147 | A | * | 11/1942 | Schade .................. 348/816 |
| 2,828,670 | A | * | 4/1958 | Luboshez ............... 359/678 |
| 4,059,343 | A | * | 11/1977 | Kowalski et al. ......... 359/669 |
| 6,128,119 | A | * | 10/2000 | Kamikubo ............ 359/204.1 |
| 6,212,022 | B1 | * | 4/2001 | Kamikubo ............ 359/837 |
| 6,377,410 | B1 | * | 4/2002 | Wang et al. ............ 359/837 |

OTHER PUBLICATIONS

D. M. Bloom, "The Grating Light Valve: revolutionizing display technology", Projection Display III Symposium, SPIE Proceedings, vol. 3013, Feb. 1997, 9 Pages.

* cited by examiner

*Primary Examiner* — Loha Ben
(74) *Attorney, Agent, or Firm* — Oblon, Spivak, McClelland, Maier & Neustadt, L.L.P.

(57) ABSTRACT

An optical element includes a plurality of first beam bodies arranged in a first direction on a first plane and being parallel to each other, and second beam bodies placed between adjacent ones of the first beam bodies and provided parallel to the first beam bodies. The first beam body has side surfaces which face the second beam bodies adjacent thereto and are sloped so that the width in the first direction gradually decreases to the upward direction perpendicular to the first plane, the second beam body has side surfaces which face the first beam bodies adjacent thereto and are sloped so that the width in the first direction gradually increases to the upward direction perpendicular to the first plane, and as viewed in the first direction, the spacing between the first beam body and the second beam body is variable.

20 Claims, 17 Drawing Sheets

OPTICAL ELEMENT, OPTICAL DEVICE, AND DISPLAY DEVICE

CROSS-REFERENCE TO RELATED APPLICATIONS

This application is based upon and claims the benefit of priority from the prior Japanese Patent Application No. 2008-076781, filed on Mar. 24, 2008; the entire contents of which are incorporated herein by reference.

BACKGROUND OF THE INVENTION

1. Field of the Invention

This invention relates to an optical element, an optical device, and a display device.

2. Background Art

Recently, rapid development has been made in high-functionality devices such as electronic devices, sensors, and actuators based on MEMS (microelectromechanical systems) technologies. Application of MEMS technologies to optical equipment such as display devices and scanners includes a technique for using a MEMS device to modulate incident light for each pixel. In this case, the MEMS device serves as a switching device for switching on/off a lightwave.

Mechanisms for modulating a lightwave are classified into two types: the mirror type, such as DMD (digital mirror device), and the grating type, such as GLV (grating light valve). The DMD is based on a reflecting mirror having a size of e.g. approximately 15 to 25 µm, which can be tilted back and forth by approximately 10 degrees so that the direction of the optical axis of the reflected light is variable. However, because the DMD needs a mechanism for tilting the reflecting mirror, the structure of the hinge supporting the mirror surface is complicated and increases the manufacturing cost. Many problems remain to be solved with regard to such aspects as manufacturing yield.

On the other hand, an example of the GLV is disclosed in D. Bloom, "The Grating Light Valve: Revolutionizing Display Technology", Projection Displays III Symposium, SPIE Proceedings Volume 3013, February 1997. This GLV has a structure in which ribbon-shaped grating elements are aligned on a silicon substrate. The grating elements alternately include fixed ones and ones that can be bent downward by electrostatic attractive force. In the state without bias application, all the grating elements are coplanar and do not generate diffracted light. On the other hand, upon application of a bias, movable grating elements are bent downward to form a concavo-convex surface in conjunction with the fixed grating elements. This concavo-convex surface diffracts light to generate diffracted light.

A MEMS device based on such grating elements has an advantage of being able to apply large optical modulation with small mechanical displacement and being capable of rapid response. Furthermore, such a MEMS device has high mechanical reliability. Hence, it has been applied to such devices as display devices, printer scanners, and gain equalizers for optical communication.

However, in conventional DMD or GLV gratings and display devices based thereon, the light source needs to be spatially spaced from the elements for mechanically switching a lightwave and to be provided with a certain incidence angle with respect thereto. This results in a large system volume occupied and limits downsizing.

SUMMARY OF THE INVENTION

According to an aspect of the invention, there is provided an optical element including: a plurality of first beam bodies arranged in a first direction on a first plane and being parallel to each other; and second beam bodies placed between adjacent ones of the first beam bodies and provided parallel to the first beam bodies, the first beam body having side surfaces which face the second beam bodies adjacent thereto and are sloped so that the width in the first direction gradually decreases to the upward direction perpendicular to the first plane, the second beam body having side surfaces which face the first beam bodies adjacent thereto and are sloped so that the width in the first direction gradually increases to the upward direction perpendicular to the first plane, and as viewed in the first direction, the spacing between the first beam body and the second beam body being variable.

According to another aspect of the invention, there is provided an optical device including: a light source; and an optical element on which light emitted from the light source is incident, the optical element including: a plurality of first beam bodies arranged in a first direction on a first plane and being parallel to each other; and second beam bodies placed between adjacent ones of the first beam bodies and provided parallel to the first beam bodies, the first beam body having side surfaces which face the second beam bodies adjacent thereto and are sloped so that the width in the first direction gradually decreases to the upward direction perpendicular to the first plane, the second beam body having side surfaces which face the first beam bodies adjacent thereto and are sloped so that the width in the first direction gradually increases to the upward direction perpendicular to the first plane, and as viewed in the first direction, the spacing between the first beam body and the second beam body being variable.

According to another aspect of the invention, there is provided an optical device including: a light source; an optical element juxtaposed with the light source, the optical element including: a plurality of first beam bodies arranged in a first direction on a first plane and being parallel to each other; and second beam bodies placed between adjacent ones of the first beam bodies and provided parallel to the first beam bodies, the first beam body having side surfaces which face the second beam bodies adjacent thereto and are sloped so that the width in the first direction gradually decreases to the upward direction perpendicular to the first plane, the second beam body having side surfaces which face the first beam bodies adjacent thereto and are sloped so that the width in the first direction gradually increases to the upward direction perpendicular to the first plane, and as viewed in the first direction, the spacing between the first beam body and the second beam body being variable; and a dispersion section provided between the light source and the optical element, the dispersion section being configured so that light emitted from the light source is dispersed in a time division manner and applied to the optical element.

According to another aspect of the invention, there is provided a display device including: an optical device including: a light source; and an optical element on which light emitted from the light source is incident, the optical element including: a plurality of first beam bodies arranged in a first direction on a first plane and being parallel to each other; and second beam bodies placed between adjacent ones of the first beam bodies and provided parallel to the first beam bodies, the first beam body having side surfaces which face the second beam bodies adjacent thereto and are sloped so that the width in the first direction gradually decreases to the upward direction perpendicular to the first plane, the second beam body having side surfaces which face the first beam bodies adjacent thereto and are sloped so that the width in the first direction gradually increases to the upward direction perpendicular to the first plane, and as viewed in the first direction, the spacing between the first beam body and the second beam body being variable; optical mechanism provided on the optical device, the optical mechanism being configured to selectively extract diffracted light generated in one of a first state and a second state; and projection mechanism configured so that the diffracted light extracted by the optical mechanism is projected on a screen.

According to another aspect of the invention, there is provided a display device including: an optical device including: a light source; and an optical element juxtaposed with the light source, the optical element including: a plurality of first beam bodies arranged in a first direction on a first plane and being parallel to each other; second beam bodies placed between adjacent ones of the first beam bodies and provided parallel to the first beam bodies; and a dispersion section made of a prism having a plane whose angle with respect to the arranging direction of the first beam bodies and the second beam bodies is variable, the dispersion section being configured so that light emitted from the light source is dispersed and applied to the first beam bodies and the second beam bodies, the first beam body having side surfaces which face the second beam bodies adjacent thereto and are sloped so that the width in the first direction gradually decreases to the upward direction perpendicular to the first plane, the second beam body having side surfaces which face the first beam bodies adjacent thereto and are sloped so that the width in the first direction gradually increases to the upward direction perpendicular to the first plane, and as viewed in the first direction, the spacing between the first beam body and the second beam body being variable; optical mechanism provided on the optical device, the optical mechanism being configured to selectively extract diffracted light generated in one of a first state and a second state; and projection mechanism configured so that the diffracted light extracted by the optical mechanism is projected on a screen in synchronization with timing of variation of the angle of the plane of the dispersion section.

According to another aspect of the invention, there is provided a display device including: an optical device including: a light source; an optical element juxtaposed with the light source, the optical element including: a plurality of first beam bodies arranged in a first direction on a first plane and being parallel to each other; and second beam bodies placed between adjacent ones of the first beam bodies and provided parallel to the first beam bodies, the first beam body having side surfaces which face the second beam bodies adjacent thereto and are sloped so that the width in the first direction gradually decreases to the upward direction perpendicular to the first plane, the second beam body having side surfaces which face the first beam bodies adjacent thereto and are sloped so that the width in the first direction gradually increases to the upward direction perpendicular to the first plane, and as viewed in the first direction, the spacing between the first beam body and the second beam body being variable, and a dispersion section provided between the light source and the optical element, the dispersion section being configured so that light emitted from the light source is dispersed in a time division manner and applied to the optical element; optical mechanism provided on the optical device, the optical mechanism being configured to selectively extract diffracted light generated in one of a first state and a second state, and projection mechanism configured so that the diffracted light extracted by the optical mechanism is projected on a screen in synchronization with timing of the time division.

DETAILED DESCRIPTION OF THE INVENTION

Figure 1A:
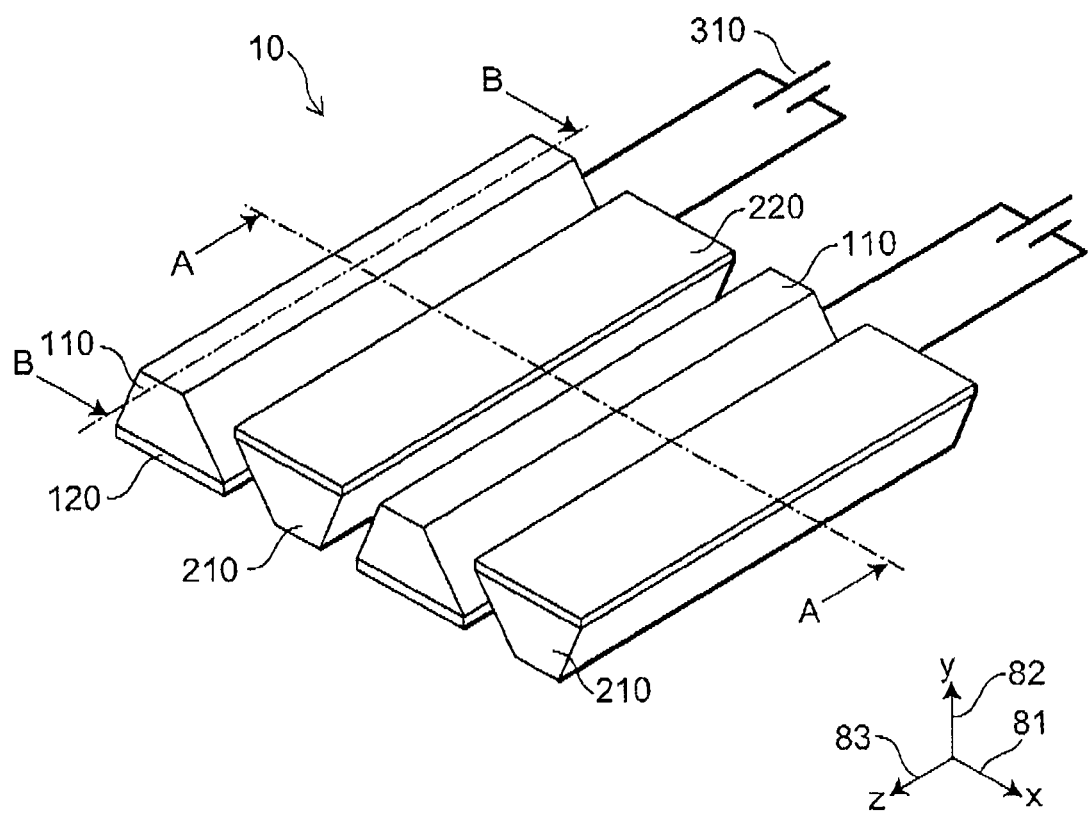
FIGS. 1A and 1B are schematic views illustrating the configuration of an optical element according to a first embodiment of the invention.

Embodiments of the invention will now be described in detail with reference to the drawings.

It is noted that the figures are schematic or conceptual. The relationship between the thickness and the width of various portions and the ratio in size between the portions are not necessarily the same as those in reality. Furthermore, the same portion may be shown differently in dimension and ratio in different figures.

In the specification and the associated drawings, the same components as those described previously with reference to earlier figures are labeled with like reference numerals, and the detailed description thereof is omitted as appropriate.

First Embodiment

FIG. 1 is a schematic view illustrating the configuration of an optical element according to a first embodiment of the invention.

Figure 1B:
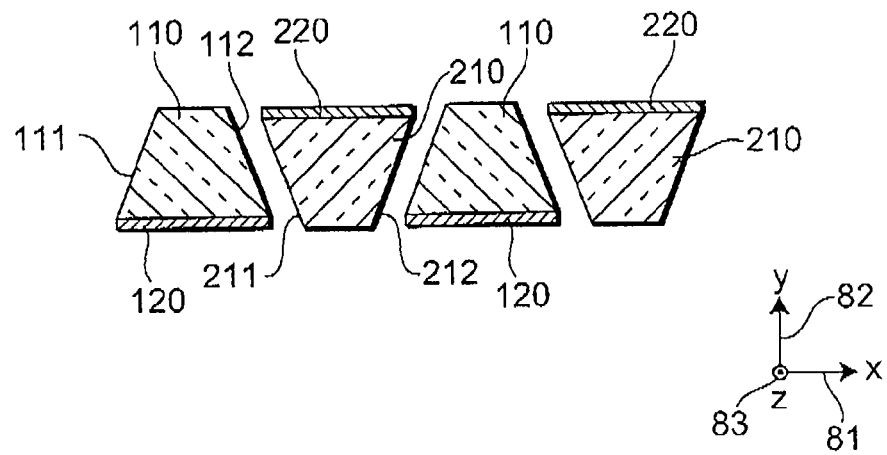

More specifically, FIG. 1A is a schematic perspective view, and FIG. 1B is a cross-sectional view taken along line A-A of FIG. 1A.

As shown in FIG. 1, the optical element 10 according to the first embodiment of the invention includes a plurality of first beam bodies 110, which are arranged in a first direction 81 on a first plane (the plane perpendicular to the y direction) and being parallel to each other, and second beam bodies 210 placed between adjacent first beam bodies 110. The first and second beam bodies 110, 210 are made of a material translucent to the light to be diffracted.

The side surfaces 111, 112 of the first beam body 110 facing the adjacent second beam bodies 210 are sloped, More specifically, these side surfaces 111, 112 are sloped so that the width of the first beam body 110 in the first direction 81 gradually decreases to the upward direction (y direction) perpendicular to the first plane (the plane perpendicular to the y direction).

On the other hand, the side surfaces 211, 212 of the second beam body 210 facing the adjacent first beam bodies 110 are also sloped. More specifically, these side surfaces 211, 212 are sloped so that the width of the second beam body 210 in the first direction 81 gradually increases to the upward direction (y direction) perpendicular to the first plane (the plane perpendicular to the y direction).

In the following, the first direction 81 is assumed to be the x-axis positive direction illustrated in FIG. 1. The direction orthogonal to the x-axis direction and the y-axis direction, which is orthogonal to the x-axis direction, is assumed to be the z-axis direction. A second direction 82 is defined as the y-axis positive direction, and a third direction 83 is defined as the z-axis positive direction. That is, the third direction 83 is orthogonal to the first direction 81 and the second direction 82, which is orthogonal to the first direction 81.

The first beam body 110 has a first side surface 111 and a second side surface 112. The second side surface 112 is provided on the side going to the x-axis positive direction relative to the first side surface 111.

The first side surface 111 includes the z-axis direction, and further includes a direction that goes to the y-axis positive direction along with going to the x-axis positive direction.

The second side surface 112 includes the z-axis direction, and further includes a direction that goes to the opposite direction (y-axis negative direction) of the y-axis positive direction along with going to the x-axis positive direction.

That is, the first side surface 111 is a slope that goes upward (to the y-axis positive direction) along with going to the x-axis positive direction, and the second side surface 112 is a slope that goes downward (to the y-axis negative direction) along with going to the x-axis positive direction.

In the following, this set of the first side surface 111 and the second side surface 112 is referred to as a "taper shape".

On the other hand, the second beam body 210 has a third side surface 211 and a fourth side surface 212. The fourth side surface 212 is provided on the side going to the x-axis positive direction relative to the third side surface 211.

The third side surface 211 includes the z-axis direction, and further includes a direction that goes to the opposite direction (y-axis negative direction) of the y-axis positive direction along with going to the x-axis positive direction.

The fourth side surface 212 includes the z-axis direction, and further includes a direction that goes to the y-axis positive direction along with going to the x-axis positive direction.

That is, the third side surface 211 is a slope (interface) that goes downward (to the y-axis negative direction) along with going to the x-axis positive direction, and the fourth side surface 212 is a slope (interface) that goes upward (to the y-axis positive direction) along with going to the x-axis positive direction.

In the following, this set of the third side surface 211 and the fourth side surface 212 is referred to as an "inverted taper shape".

Thus, in the optical element 10 according to this embodiment, the first beam bodies 110 having a taper shape and the second beam bodies 210 having an inverted taper shape are alternately arranged.

Furthermore, as viewed in the x-axis direction, the spacing between the first beam body 110 and the second beam body 210 can be varied.

More specifically, the first beam bodies 110 and the second beam bodies 210 are supported on and spaced from a substrate (not shown) by a support section (not shown) and an anchor (not shown) connected to the support section, both extending in the z-axis direction.

Furthermore, for example, in the optical element 10 illustrated in FIG. 1, the first beam body 110 has a first electrode 120 on its lower surface (the surface facing the y-axis negative direction). The second beam body 210 has a second electrode 220 on its upper surface (the surface facing the y-axis positive direction). The first electrode 120 and the second electrode 220 are connected to a power supply 310, and a voltage is applied to these electrodes to generate an electrostatic suction force, by which the spacing between the first beam body 110 and the second beam body 210 can be varied.

In the optical element 10, the first electrode 120 is provided on the lower surface of the first beam body 110, and the second electrode 220 is provided on the upper surface of the second beam body 210, but the invention is not limited thereto. As described later, the location where the first electrode 120 and the second electrode 220 are provided can be variously modified.

Furthermore, in the optical element 10, the cross-sectional shape of the first beam body 110 in the A-A cross section is a trapezoid with the upper side being shorter than the lower side. However, for example, it may be a triangle, or the upper side may be effectively eliminated. That is, the first beam body 110 only needs to have a taper shape composed of the set of the first side surface 111 and the second side surface 112, and its cross-sectional shape is arbitrary.

Likewise, in the optical element 10, the cross-sectional shape of the second beam body 210 in the A-A cross section is a trapezoid with the upper side being longer than the lower side. However, for example, it may be a triangle, or the lower side may be effectively eliminated. That is, the second beam body 210 only needs to have an inverted taper shape composed of the set of the third side surface 211 and the fourth side surface 212, and its cross-sectional shape is arbitrary.

Furthermore, although FIG. 1 illustrates two first beam bodies 110 and two second beam bodies 210, the invention is not limited thereto. The optical element 10 according to this embodiment can include e.g. 960 first beam bodies 110 and e.g. 960 second beam bodies 210 placed between adjacent ones thereof. Thus, the number of first beam bodies 110 and second beam bodies 210 is arbitrary.

FIG. 2 is a schematic cross-sectional view illustrating the operating state of the optical element according to the first embodiment of the invention.

Figure 2A:
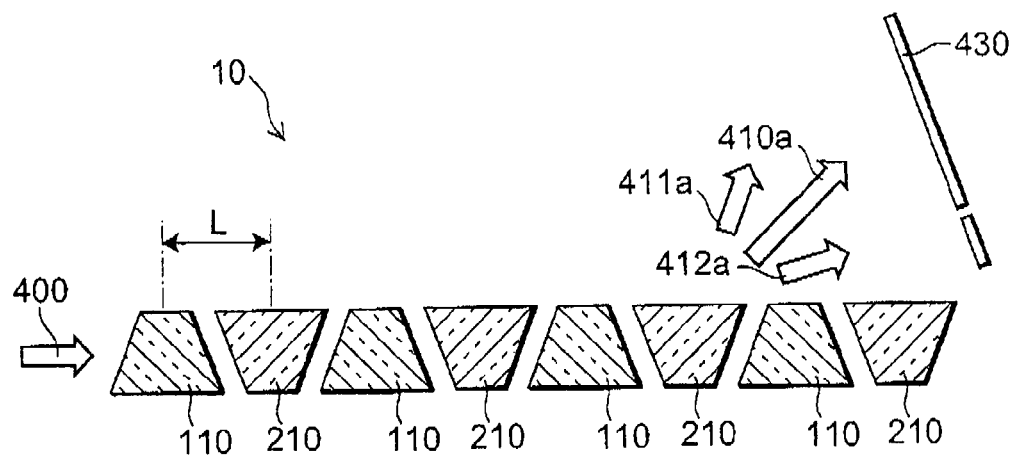
FIGS. 2A and 2B are schematic cross-sectional views illustrating the operating state of the optical element according to the first embodiment of the invention.
Figure 2B:
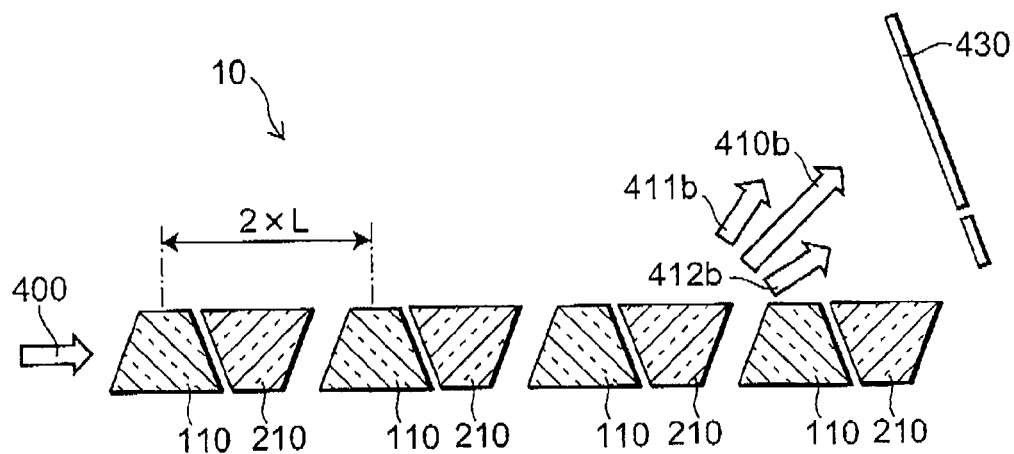

More specifically, FIGS. 2A and 2B illustrate a first state and a second state of the first beam bodies 110 and the second beam bodies 210 of the optical element 10. It is noted that for description purposes, the number of first beam bodies 110 and second beam bodies 210 illustrated is different from that in FIG. 1.

As shown in FIG. 2A, the first state is a state in which, for example, no voltage is applied to the first electrode 120 and the second electrode 220 of the optical element 10 according to this embodiment. Here, the first beam bodies 110 and the second beam bodies 210 are equidistantly arranged, for example, and the gaps between the first beam bodies 110 and the second beam bodies 210 are also equidistantly arranged. That is, in the first state, the optical period of the optical medium made of the first beam bodies 110 and the second beam bodies 210 (and the gaps therebetween), referred to as the first period, is equal to the arrangement pitch L of the first beam bodies 110 and the second beam bodies 210.

On the other hand, as shown in FIG. 2B, the second state is a state in which, for example, a voltage is applied to the first electrode 120 and the second electrode 220 of the optical element 10 according to this embodiment. The first beam body 110 and the second beam body 210 of the set across which the voltage is applied come close to each other by electrostatic suction force. Hence, narrow and wide gaps alternately occur between the first beam bodies 110 and the second beam bodies 210. Thus, in the second state, the optical period of the optical medium made of the first beam bodies 110 and the second beam bodies 210 (and the gaps therebetween), referred to as the second period, is equal to twice L.

In the optical element 10, the first beam bodies 110 and the second beam bodies 210 are periodically arranged. Hence, the optical element 10 irradiated with incident light 400 generates diffracted lights with modulated intensity by mutual interference.

More specifically, as shown in FIG. 2A, in the first state, zeroth-order diffracted light 410a, minus first-order diffracted light 411a, plus first-order diffracted light 412a, and higher-order diffracted light (not shown) are generated. As shown in FIG. 2B, in the second state, zeroth-order diffracted light 410b, minus first-order diffracted light 411b, plus first-order diffracted light 412b, and higher-order diffracted light (not shown) are generated. In the following, the description of the behavior of the higher-order diffracted light is omitted.

The zeroth-order diffracted light 410b, the minus first-order diffracted light 411b, and the plus first-order diffracted light 412b in the above second state are generated in a different condition from that of the zeroth-order diffracted light 410a, the minus first-order diffracted light 411a, and the plus first-order diffracted light 412a in the first state.

For example, the angle that the minus first-order diffracted light 411b and the plus first-order diffracted light 412b make with the zeroth-order diffracted light 410b in the second state is smaller than the angle that the minus first-order diffracted light 411a and the plus first-order diffracted light 412a make with the zeroth-order diffracted light 410a in the first state. At this time, modulation or switching of light can be achieved by providing a slit 430 or the like that transmits the plus first-order diffracted light 412a in the first state but blocks the other light.

At this time, a higher output can be obtained by extracting the minus first-order diffracted light 411a as well as the plus first-order diffracted light 412a and optically combining them. That is, the slit 430 may be configured so as to transmit the plus first-order diffracted light 412a and the minus first-order diffracted light 411a but block the rest, i.e., the zeroth-order diffracted light 410a, 410b, and the minus first-order diffracted light 411b and the plus first-order diffracted light 412b in the second state.

The foregoing has illustrated the case where diffracted light in the first state is extracted by the slit 430. However, conversely, diffracted light in the second state may be extracted, and diffracted light in the first state may be blocked. Also in this case, a higher output can be obtained by extracting the plus first-order and minus first-order diffracted light and combining them.

Thus, modulation or switching of light can be achieved by the optical element 10 according to this embodiment, which can be used for various applications such as optical scanners, printers, dynamic gain equalizers, and display devices. The optical element 10 is characterized by being capable of rapid response, having a small insertion loss, and having a wide dynamic range. Furthermore, it can be analog actuated and has high reliability and stability. Moreover, as described later in detail, the optical element 10 can be manufactured with high productivity, has good compatibility with semiconductor processes, and is easily integrated with CMOS logic circuits.

It is noted that in the second state illustrated in FIG. 2B, both the first beam body 110 and the second beam body 210 may come close to each other, or only one of the first beam body 110 and the second beam body 210 may be movable and come close to the other. Furthermore, in the second state, the first beam body 110 and the second beam body 210 adjacent thereto may be in close contact with, or spaced from, each other.

The foregoing assumes that the first state and the second state are the voltage non-applied state and the voltage applied state, respectively. However, the first state may be the voltage applied state, and the second state may be the voltage non-applied state. That is, it is only necessary to provide two states in which the distance between the first beam body 110 and the second beam body 210 is varied so as to form states of an optical medium having different periods.

It is noted that the light incident on the optical element 10 according to this embodiment can be applied from an arbitrary direction with respect to the optical element 10. For example, as described later, the first beam body 110 and the second beam body 210 can be made of a material capable of effectively transmitting light having a prescribed wavelength, and the light can be applied from the arranging direction of the first beam bodies 110 and the second beam bodies 210 (x-axis direction) to generate diffracted light.

Figure 3A:
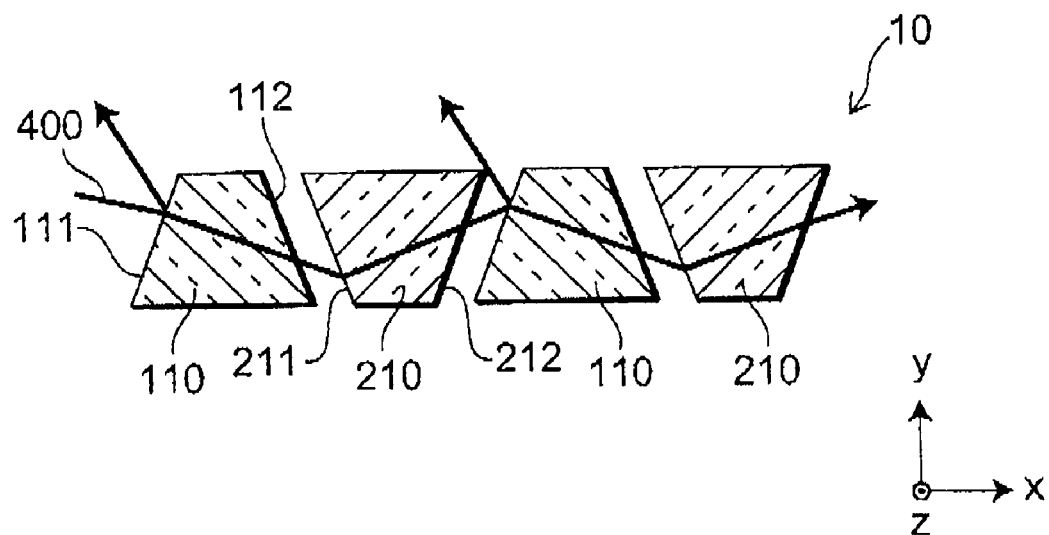
FIGS. 3A and 3B are schematic cross-sectional views illustrating the configuration of the optical element according to the first embodiment of the invention and the optical element of a comparative example, respectively.
Figure 3B:
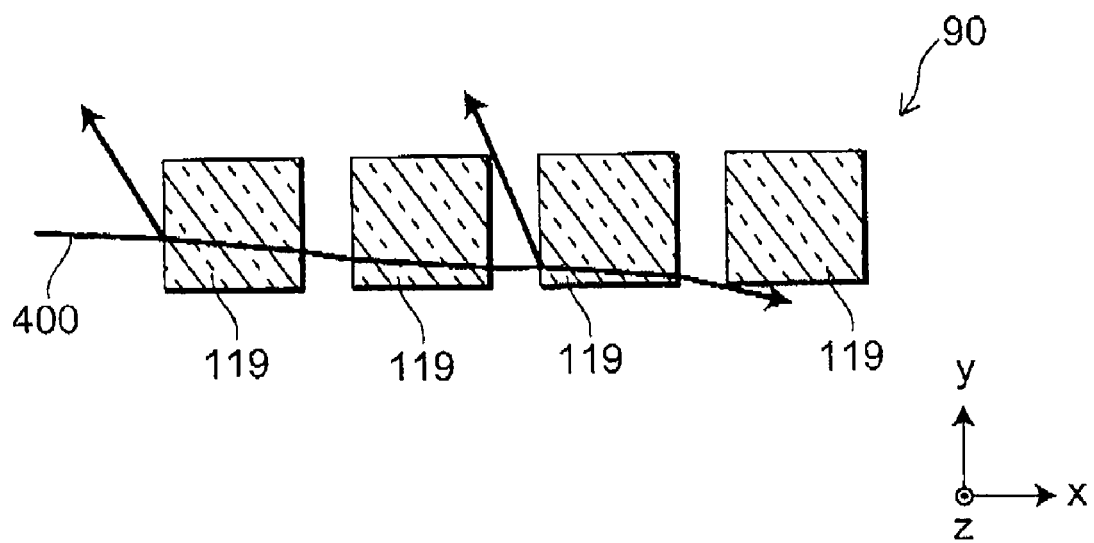

FIGS. 3A and 3B are schematic cross-sectional views illustrating the configuration of the optical element according to the first embodiment of the invention and the optical element of a comparative example, respectively.

FIG. 3A is a cross-sectional view taken along line A-A of FIG. 1A, that is, a cross-sectional view of the main part of the optical element 10 according to this embodiment in the plane formed by the x axis and the y axis. Likewise, FIG. 3B is a cross-sectional view of the main part of the optical element of the comparative example in the plane formed by the x axis and the y axis. It is noted that for description purposes, the number of first beam bodies 110 and second beam bodies 210 illustrated is different from that in FIG. 2.

As shown in FIG. 3B, the optical element 90 of the comparative example is different from the optical element 10 according to this embodiment illustrated in FIG. 1 in that the beam body 119 is shaped like a rectangular parallelepiped. That is, in the optical element 90 of the comparative example, the beam body 119 has neither a taper shape nor an inverted taper shape.

Here, it is assumed that incident light 400 is applied to the optical element 90 from its lateral side, that is, from the x-axis direction along which the beam bodies of the optical element 90 are arranged. It is noted here that the direction of the incident light 400 applied to the beam body 119 is not exactly parallel to the x axis, but oblique to the x axis at a prescribed angle. In this case, the incident light 400 travels in the gap between the beam bodies 119 along a certain oblique direction (downward in the figure, that is, opposite to the y-axis direction). Consequently, the number of beam bodies 119 through which the incident light 400 can pass is restricted. FIG. 3B illustrates a situation where the incident light 400 passes through only three beam bodies 119, but fails to pass through the remaining beam bodies 119.

On the other hand, as shown in FIG. 3A, in the optical element 10 according to this embodiment, it is assumed that, like the comparative example, incident light 400 is applied to the beam bodies from the lateral side of the optical element 10 in a direction oblique to the x axis at a prescribed angle. Here, in the case of the optical element 10 according to this embodiment, the number of first beam bodies 110 and second beam bodies 210 through which the incident light 400 can pass is larger than that of the comparative example.

More specifically, part of the lightwave incident on the first beam body 110 is reflected by the boundary of the first side surface 111 at a prescribed angle. Another part of the lightwave is refracted at a prescribed angle in accordance with the incidence angle on the first side surface 111 of the first beam body 110 and the refractive index of the first beam body 110 and introduced into the first beam body 110. Here, the refracted light is refracted downward in the figure (opposite to the y-axis direction). Furthermore, when it is incident on the second side surface 112 of the first beam body 110, the phenomenon of refraction and reflection (not shown) occurs likewise.

The lightwave that has passed through the first beam body 110 then reaches the interface of the third side surface 211 of the second beam body 210. Here, the second beam body 210 has the inverted taper shape, and the lightwave is refracted upward in the figure at the third side surface 211. The lightwave then travels in the second beam body 210, and is emitted upward in the figure from the fourth side surface 212.

Then, the above behavior is repeated.

Thus, in the optical element 10 according to this embodiment, because the first beam body 110 and the second beam body 210 have the taper shape and the inverted taper shape, respectively, the travel of the incident light 400 is not limited to a constant direction, but the incident light 400 can pass through many beam bodies in the x-axis direction although it is refracted at each interface.

That is, when incident light 400 is applied to the optical element from its lateral side, the number of beam bodies through which the lightwave can pass is larger in the optical element 10 according to this embodiment. Hence, the above diffracted light (interference light) has a higher intensity than in the optical element of the comparative example.

Thus, in the case where a light source is placed on the lateral side of the optical element 10, in particular, the optical element 10 according to this embodiment can achieve higher performance than the optical element 90 of the comparative example. As compared with the case where the light source is placed above the optical element (in the y-axis direction of FIG. 2) and spaced therefrom, this embodiment can downsize the overall configuration including the light source and the optical element.

That is, the optical element 10 according to this embodiment allows a light source to be placed on the lateral side of the optical element and can be adapted to system downsizing.

By using the optical element 10 according to this embodiment, a small device with a light source placed on the lateral side of the optical element can also achieve high performance. Thus, the optical element 10 according to this embodiment can be applied to a display device to realize a small display device with high display brightness and contrast and a large number of pixels.

Furthermore, the optical element 10 according to this embodiment can be applied to various devices such as scanners and gain equalizers for optical communication to realize devices with high performance.

It is noted that in the optical element 10 according to this embodiment, in the case where light is applied from the lateral side of the optical element as described above, the first beam body 110 and the second beam body 210 can be made of a material capable of effectively transmitting the incident light. More specifically, for visible incident light, the first beam body 110 and the second beam body 210 can be made of a material translucent to visible light, such as silicon oxide. For infrared incident light, the first beam body 110 and the second beam body 210 can be made of a material translucent to infrared light, such as silicon. The above translucency only needs to be translucency that is practically required, and may have practically allowable absorptivity.

In the case where light is applied from the lateral side of the optical element 10, the optical element 10 according to this embodiment particularly achieves higher performance than the optical element of the comparative example. However, light may be applied from above the optical element 10. Also in this case, the optical element 10 according to this embodiment can achieve high performance. That is, the optical element 10 according to this embodiment can be irradiated with light from various directions such as the lateral side, upside, and downside and can achieve high performance in all these cases. In contrast, light is applied to the optical element 90 of the comparative example from the lateral side, the number of beam bodies through which the light can pass is restricted, and hence the performance is significantly degraded.

In the optical element 10 according to this embodiment, the reflected light having a y-axis component generated at the interface of the beam body is extracted as interference light. Here, in the interference light, the angular radius θ of the p-th bright line counted from the center is expressed as;

$$\theta \sim \frac{1}{n_1} \sqrt{\frac{n_2 \lambda}{t}} \sqrt{p - 1 + e} \tag{1}$$

where $n_1$ is the refractive index of the beam body, $n_2$ is the refractive index of the medium (air, in the optical element of this embodiment) interposed between the beam bodies, e is the fractional order, t is the spacing between the beam bodies, and λ is the wavelength of the lightwave.

As expressed in formula (1), the angular spacing of the interference light is proportional to $(1/t)^{1/2}$, and the angular radius θ of the bright line is proportional to the square root of a natural number.

As the spacing t between the beam bodies increases, the angle of the interference light is shifted. When t is shifted by λ/2, new interference light is generated. That is, the position of the extracted interference light can be controlled by varying the spacing between the beam bodies. Thus, as described above with reference to FIG. 2, the interference light (diffracted light) is controlled by varying the spacing between the first beam body 110 and the second beam body 210 using the applied voltage, and consequently, light in various states can be extracted.

It is noted that the light applied to the optical element 10 according to this embodiment can be monochromatic, or white light, for example, including a plurality of wavelength components. Thus, a lightwave including only a specific wavelength component can be selectively extracted in an arbitrary direction.

FIGS. 4 to 6 are schematic cross-sectional views showing variations of the optical element according to the first embodiment of the invention.

More specifically, FIGS. 4 to 6 are cross-sectional views taken along the A-A cross section of FIG. 1A, all illustrating, for example, the first state, which is the voltage non-applied state.

Figure 4A:
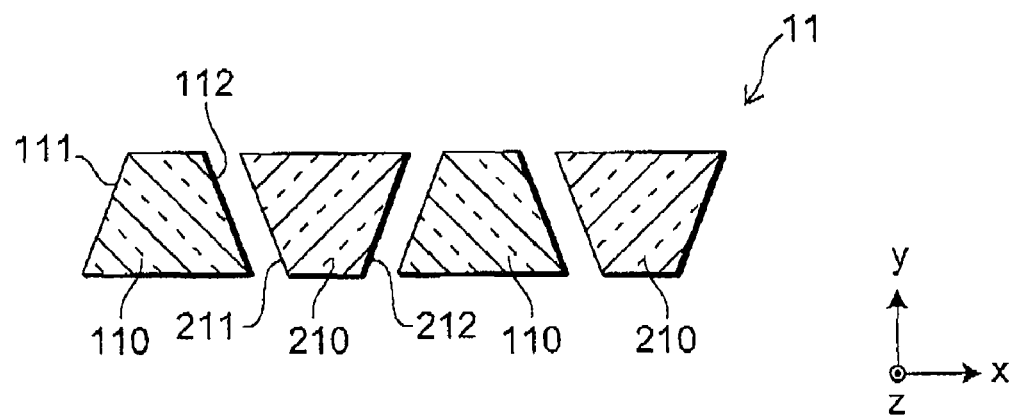
FIGS. 4A to 4C are schematic cross-sectional views showing variations of the optical element according to the first embodiment of the invention.

As shown in FIG. 4A, in the optical element 11 of a variation according to this embodiment, the first beam body 110 has a taper shape with the upper side having half the length of the lower side. The second beam body 210 has an inverted taper shape with the upper side having twice the length of the lower side. In this example, the upper side of the first beam body 110 is equal in length to the lower side of the second beam body 210. Furthermore, in this example, the spacing between the first beam body 110 and the second beam body 210 is equal to the upper side of the first beam body 110.

Figure 4B:
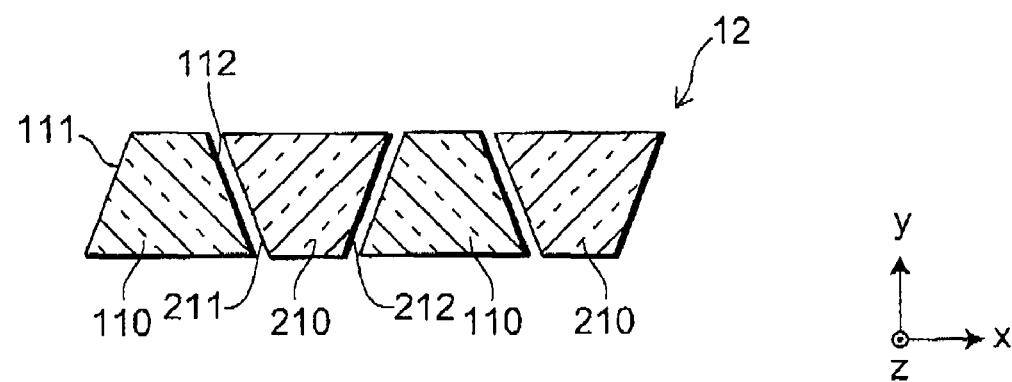

As shown in FIG. 4B, in the optical element 12 of another variation, the shape of the first beam body 110 and the second beam body 210 is the same as that in the optical element 11, but the spacing between the first beam body 110 and the second beam body 210 is shorter than in the optical element 11.

If the distance between the first beam body 110 and the second beam body 210 is short, a large electrostatic suction force acts between the first beam body 110 and the second beam body 210. Hence, the actuation voltage can be reduced.

Figure 4C:
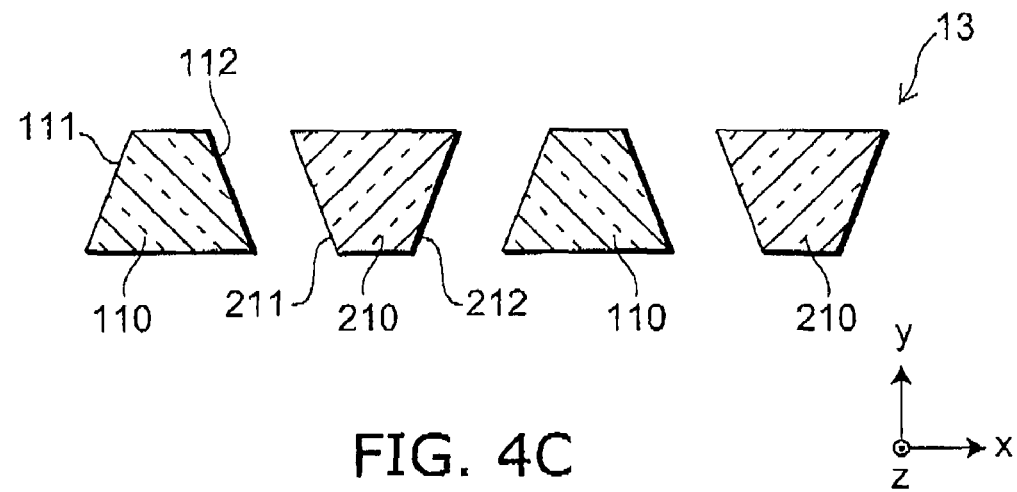

As shown in FIG. 4C, in the optical element 13 of another variation, the shape of the first beam body 110 and the second beam body 210 is the same as that in the optical element 11, but the spacing between the first beam body 110 and the second beam body 210 is longer than in the optical element 11. If the distance between the first beam body 110 and the second beam body 210 is long, the spacing between the beam bodies is subjected to large variation between in the first state and in the second state. Hence, a large variation can be provided to the optical characteristics.

Thus, the spacing between the first beam body 110 and the second beam body 210 can be arbitrarily configured on the basis of the desired actuation condition and optical characteristics.

Figure 5A:
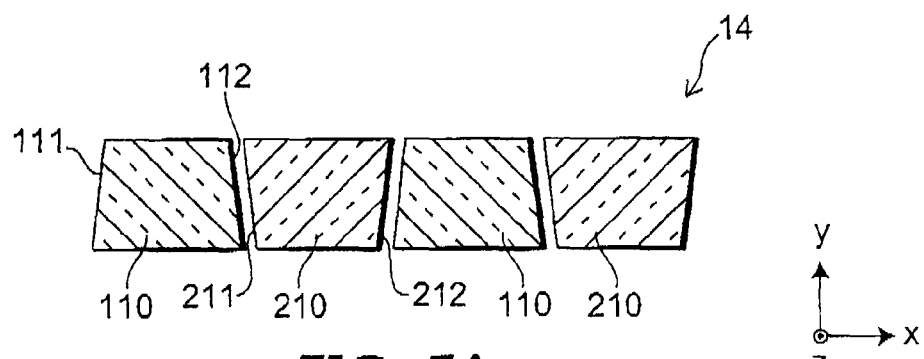
FIGS. 5A to 5D are schematic cross-sectional views showing variations of the optical element according to the first embodiment of the invention.

As shown in FIG. 5A, in the optical element 14 of another variation, the ratio between the upper side and the lower side in each of the first beam body 110 and the second beam body 210 is closer to 1 than in the optical element 11 illustrated in FIG. 4A. It is noted that if the ratio between the upper side and the lower side in each of the first beam body 110 and the second beam body 210 is 1, the cross-sectional shape of the beam body is rectangular as illustrated in FIG. 3B, which fails to achieve the effect of increasing the number of beam bodies through which incident light can pass, as described above with reference to FIG. 3.

Figure 5B:
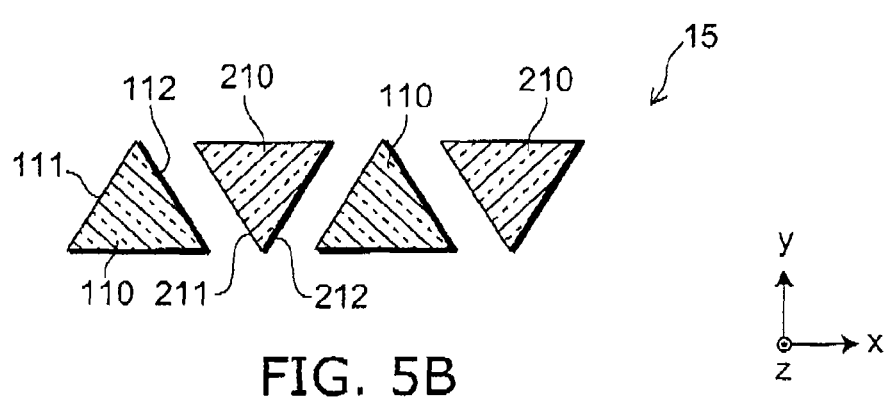

As shown in FIG. 5B, in the optical element 15 of another variation, the ratio between the upper side and the lower side in each of the first beam body 110 and the second beam body 210 is decreased from 1 to 0, as compared with the optical element 11 illustrated in FIG. 4A. That is, the first beam body 110 is a triangle, which corresponds to a trapezoid with no upper side, and the second beam body 210 is an inverted triangle, which corresponds to a trapezoid with no lower side.

Figure 5C:
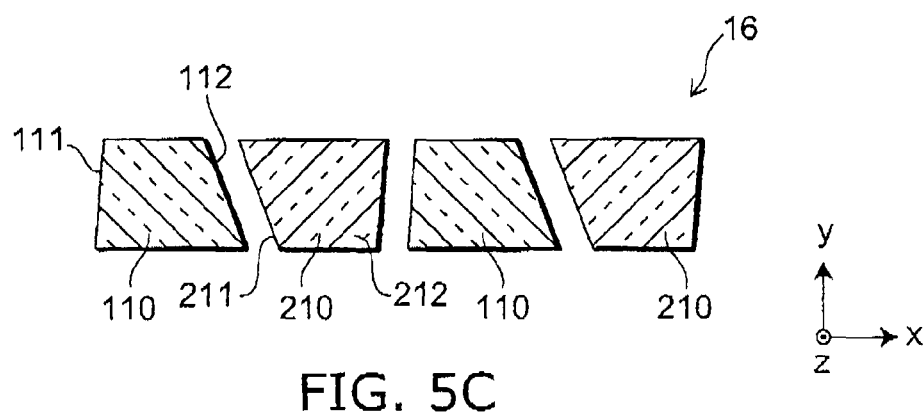

As shown in FIG. 5C, in the optical element 16 of another variation, the angles that the first side surface 111 and the second side surface 112 in the first beam body 110 make with the x axis are different from each other. Furthermore, the angles that the third side surface 211 and the fourth side surface 212 in the second beam body 210 make with the x axis are different from each other.

Figure 5D:
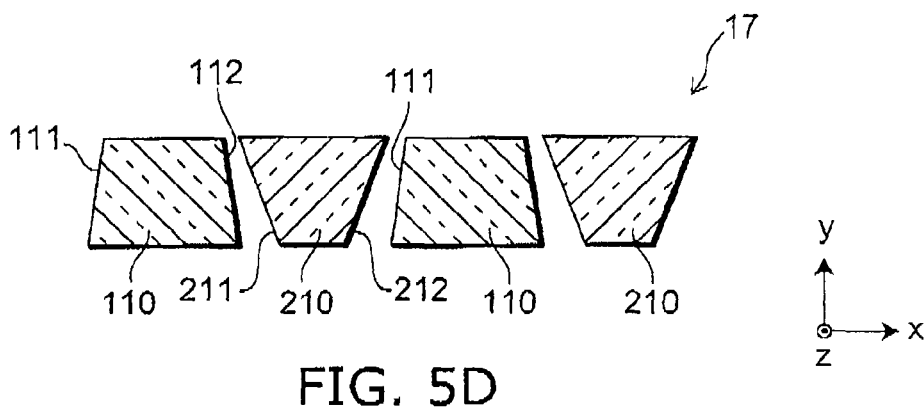

As shown in FIG. 5D, in the optical element 17 of another variation, the opposed surfaces of the adjacent beam bodies are not parallel. That is, the second side surface 112 of the first beam body 110 and the third side surface 211 of the second beam body 210 are unparallel. Furthermore, the fourth side surface 212 of the second beam body 210 and the first side surface 111 of the first beam body 110 are unparallel.

Thus, the first beam body 110 and the second beam body 210 can have various cross-sectional shapes, and the angle between the opposed surfaces of the first beam body 110 and the second beam body 210 located adjacently can be arbitrarily configured.

Figure 6A:
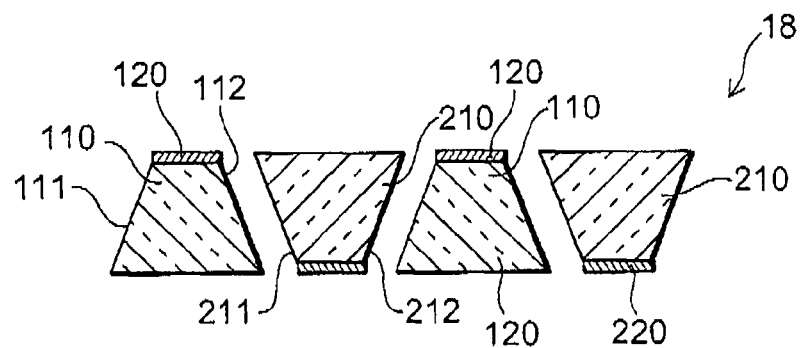
FIGS. 6A to 6D are schematic cross-sectional views showing variations of the optical element according to the first embodiment of the invention.

As shown in FIG. 6A, the optical element 18 of another variation is different from the optical element 10 illustrated in FIG. 1 in the layout of the electrodes. More specifically, in the optical element 18, the first electrode 120 is provided on the lower surface of the first beam body 110, and the second electrode 220 is provided on the upper surface of the second beam body 210.

Figure 6B:
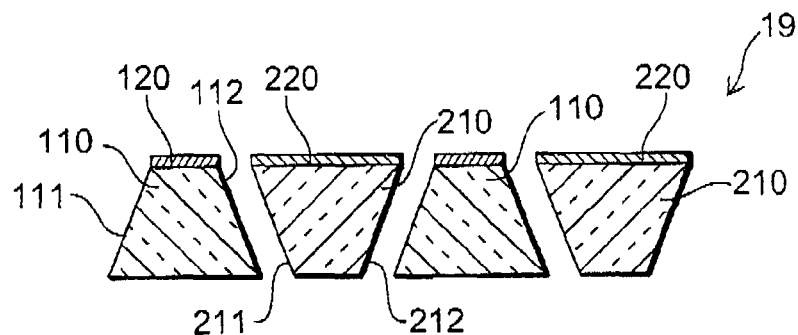

As shown in FIG. 6B, in the optical element 19 of another variation, the first electrode 120 and the second electrode 220 are provided on the upper surface of each of the first beam body 110 and the second beam body 210.

Figure 6C:
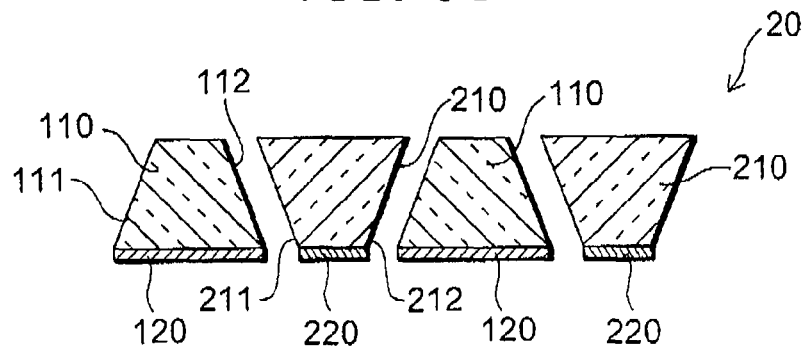

As shown in FIG. 6C, in the optical element 20 of another variation, the first electrode 120 and the second electrode 220 are provided on the lower surface of each of the first beam body 110 and the second beam body 210.

Figure 6D:
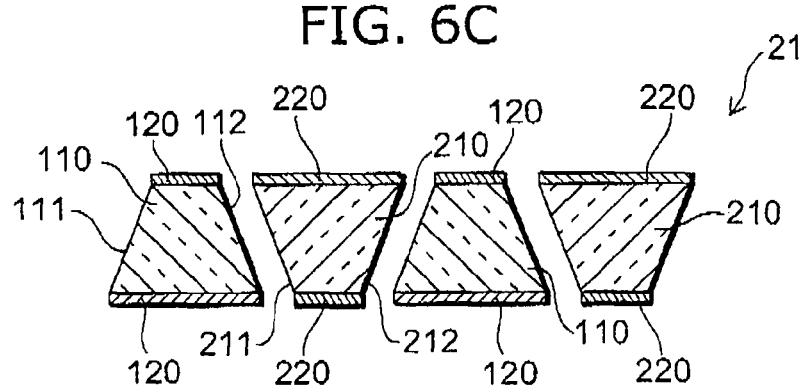

As shown in FIG. 6D, in the optical element 21 of another variation, the first electrode 120 and the second electrode 220 are provided on the upper surface and the lower surface of each of the first beam body 110 and the second beam body 210. Thus, electrodes can be redundantly provided to produce an optical element which can be actuated stably even in the case of damage to the electrodes and the interconnect portion connected thereto. Hence, the optical element can be manufactured with a reduced defect rate and high reliability.

In the foregoing, the first electrode 120 and the second electrode 220 are provided on at least one of the upper surface and the lower surface of the first beam body 110 and the second beam body 210, respectively, but the invention is not limited thereto. The first electrode 120 and the second electrode 220 can be provided in arbitrary configurations as long as an electric potential can be provided to the first beam body 110 and the second beam body 210, respectively. For example, the first beam body 110 and the second beam body 210 may be formed from a conductive material such as a semiconductor, and the first electrode 120 and the second electrode 220 may be identical to the first beam body 110 and the second beam body 210, respectively. Furthermore, the first electrode 120 and the second electrode 220 may be formed inside the first beam body 110 and the second beam body 210, respectively. In this case, for example, the first electrode 120 and the second electrode 220 can be provided with an opening for transmitting a lightwave so that the lightwave can propagate therethrough.

It is noted that each shape and layout of the various beam bodies illustrated in FIGS. 1, 4, and 5 can be combined with any of the various electrode layouts illustrated in FIGS. 1 and 6 to form various optical elements according to this embodiment.

Figure 7:
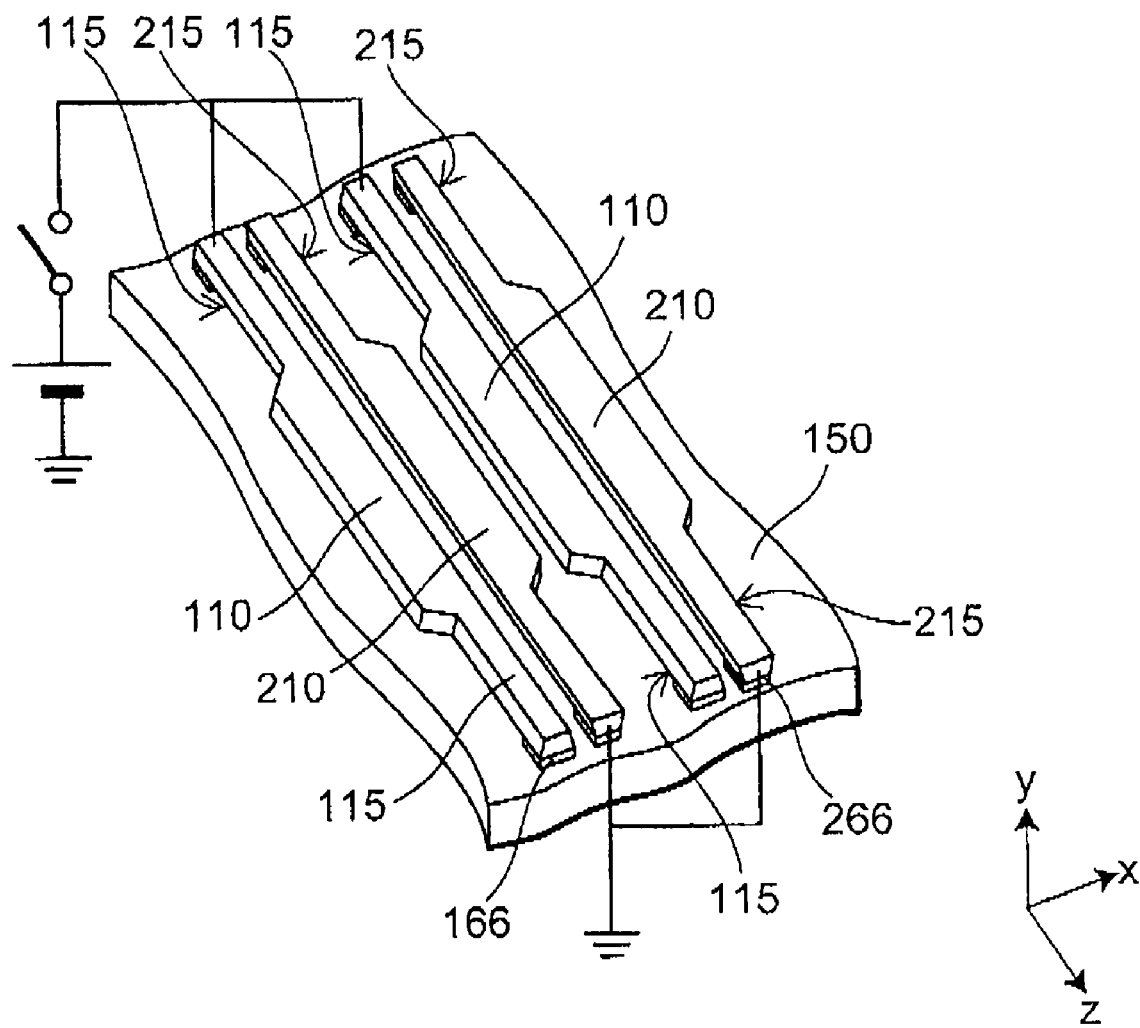
FIG. 7 is a schematic perspective view illustrating the configuration of the optical element according to the first embodiment of the invention.

FIG. 7 is a schematic perspective view illustrating the configuration of the optical element according to the first embodiment of the invention. As shown in FIG. 7, in the optical element 10 according to this embodiment, the first beam body 110 and the second beam body 210 are connected to a first support section 115 and a second support section 215, respectively, and each support section is bonded to a substrate 150 using respective anchors 166 and 266. The anchor can be made of any of various oxide films such as a silicon oxide film.

The first beam body 110 and the second beam body 210 are held by the respective support sections and respective anchors 166 and 266 with a gap to the substrate 150. As described above, the first beam body 110 and the second beam body 210 are provided, respectively, with a first electrode 120 and a second electrode 220, not shown. By controlling the potential difference therebetween, the first beam body 110 and the second beam body 210 move to vary the mutual distance in the x-axis direction so that the optical element 10 can vary its optical characteristics.

In the example of FIG. 7, the first support section 115 is connected to both ends of the first beam body 110, and the second support section 215 is connected to both ends of the second beam body 210. However, the support section only needs to be connected to at least one of the ends of each of the first beam bodies 110 and the second beam bodies 210. Then, part of the support section connected to at least one end of each beam body only needs to be fixed to the common substrate 150. The above anchor 166 can be used for this fixation.

In the optical element according to this embodiment, the width (the length in the x-axis direction) of the first beam body 110 and the second beam body 210 can illustratively be 0.5 to 10 μm. The spacing (the distance in the plane including the x axis and the z axis) between the first beam body 110 and the second beam body 210 can illustratively be 0.2 to 10 μm. The width of the beam body can be suitably adapted to the wavelength of light applied to the optical element.

The thickness (the length in the y-axis direction) of the first beam body 110 and the second beam body 210 can illustratively be 0.5 to 1000 μm. A larger thickness of the first beam body 110 and the second beam body 210 is more preferable because the efficiency of light diffraction can then be increased.

The length (the length in the z-axis direction) of the first beam body 110 and the second beam body 210 can illustratively be 100 to 2000 μm. The length of the beam body can be determined in accordance with the size of the incident light beam.

However, the invention is not limited to the above dimensions, but various other dimensions can be used.

Figure 8:
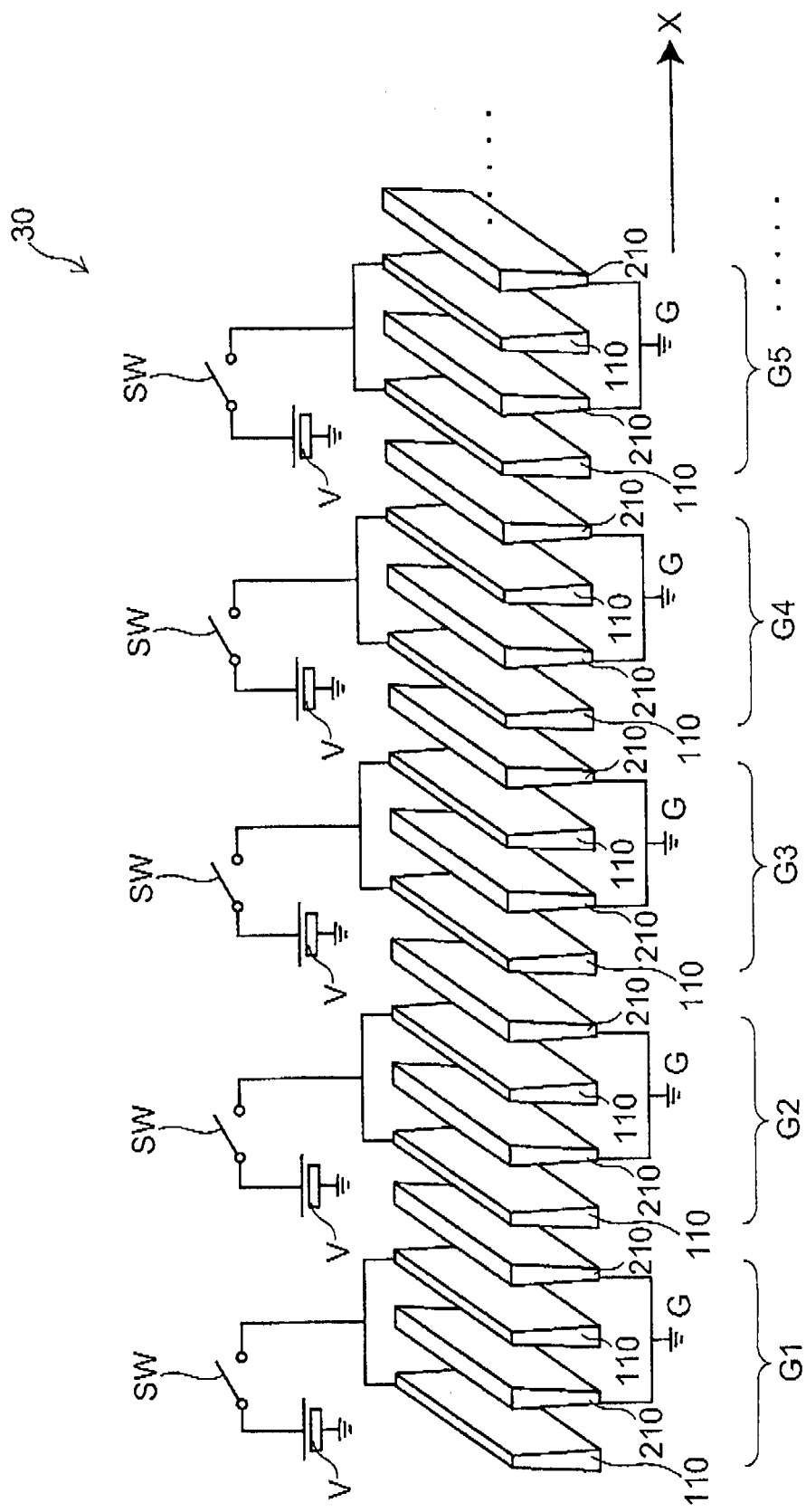
FIG. 8 is a schematic perspective view illustrating another configuration of the optical element according to the first embodiment of the invention.

FIG. 8 is a schematic perspective view illustrating another configuration of the optical element according to the first embodiment of the invention.

More specifically, FIG. 8 illustrates the configuration of the optical element according to this embodiment in its application to a display device, for example. That is, it is an example of the optical element according to this embodiment that enables modulation/switching of light for each pixel of a display device.

As shown in FIG. 8, another optical element 25 according to this embodiment also includes a plurality of first beam bodies 110 arranged in the first direction (x-axis direction) and second beam bodies 210 placed between adjacent first beam bodies 110.

In this embodiment, two pairs of beam bodies are combined into one group, where the pair is composed of one first beam body 110 and one second beam body 210. The groups G1, G2, G3, . . . are equidistantly provided.

In each group, the first beam body 110 is connected to a power supply V through an associated switch SW, and the second beam body 210 is connected to the ground potential G.

That is, by using the switch SW to turn on/off the actuation voltage from the power supply V, the period of beam bodies can be varied for each group as described above with reference to FIG. 2.

Thus, the optical element 25 according to this embodiment can be used to independently perform modulation/switching of light for each group. In the case where this optical element 25 is applied to an optical scanner, printer, display device or the like, the groups G1, G2, . . . can be associated with respective pixels in the optical scanner, printer, or display device so that modulation/switching of light can be performed in each pixel.

Although FIG. 8 shows a specific example in which each group includes two beam bodies, the invention is not limited thereto. Each group may include three or more beam bodies.

In various optical elements according to this embodiment, a reflecting layer made of a material having a high optical reflectance can be provided on at least one of the upper surface and the lower surface of the first beam body 110 and the second beam body 210. Thus, the intensity of diffracted light can be increased by the reflection effect. It is noted that this reflecting layer may also serve as the first electrode 120 and the second electrode 220.

In the following, a method for manufacturing the optical element according to this embodiment is described.

FIG. 9 is a schematic cross-sectional view based on the process sequence illustrating the method for manufacturing the optical element according to the first embodiment of the invention.

FIG. 10 is a schematic cross-sectional view based on the process sequence subsequent to FIG. 9, and FIG. 11 is a schematic cross-sectional view based on the process sequence subsequent to FIG. 10.

In these figures, the figure on the left side is a cross-sectional view in the plane including the x axis and the y axis corresponding to the A-A cross section of FIG. 1, and the figure on the right side is a cross-sectional view in the plane including the z axis and the y axis corresponding to the B-B cross section of FIG. 1.

Figure 9A:
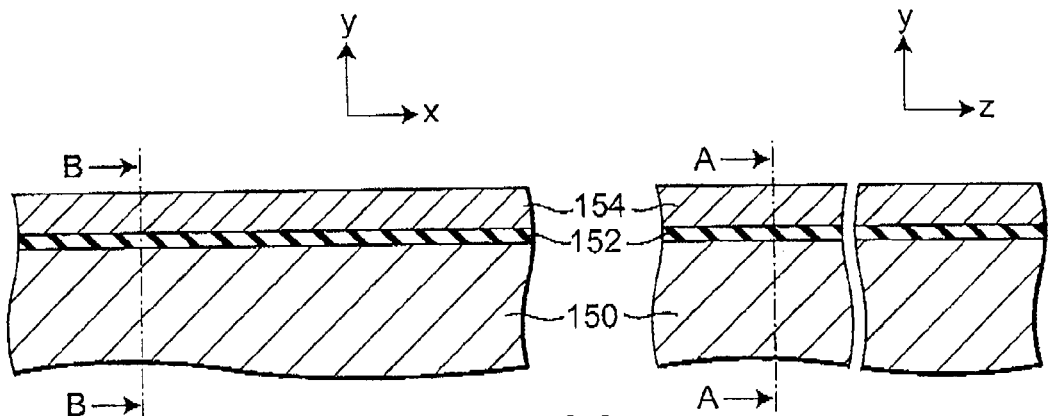
FIGS. 9A to 9D are schematic cross-sectional views based on the process sequence illustrating the method for manufacturing the optical element according to the first embodiment of the invention.

As shown in FIG. 9A, for example, a buried oxide (BOX) layer, that is, a silicon oxide layer, is deposited as an insulating layer 152 on a substrate 150 made of a single crystal silicon substrate. A single crystal silicon layer 154, for example, is deposited thereon as a single crystal semiconductor layer.

That is, this example uses an SOI (silicon on insulator) substrate in which a single crystal semiconductor layer is laminated on a substrate 150 via an insulating layer 152. Besides the foregoing process, this SOI substrate may be prepared by implanting impurity into the bulk of the substrate 150 to form an insulating layer so that the substrate 150 above the insulating layer serves as a single crystal semiconductor layer. Alternatively, the SOI substrate may be prepared by forming an insulating layer on the substrate 150 and sticking a single crystal semiconductor layer to the surface of this insulating layer.

Figure 9B:
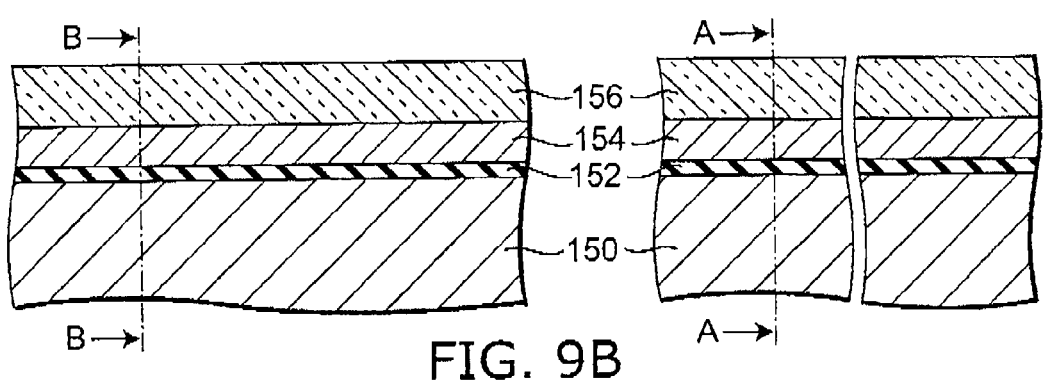

Next, as shown in FIG. 9B, a silicon oxide film 156 is deposited on the single crystal silicon layer 154. The silicon oxide film 156 is illustratively a silicon dioxide film, which can be deposited by various film formation methods such as the CVD (chemical vapor deposition) method.

Figure 9C:
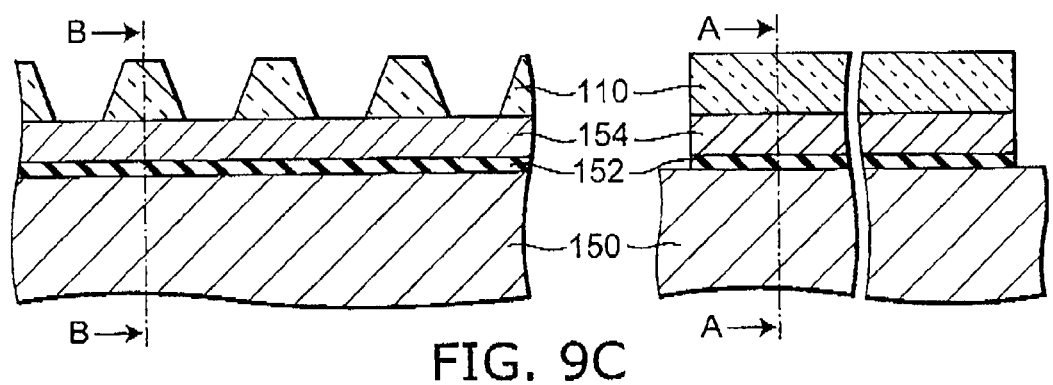

Next, as shown in FIG. 9C, a resist mask having a prescribed shape is formed by photolithography on the silicon oxide film 156, and then subjected to dry etching or wet etching. Here, by suitably controlling the exposure condition and etching condition for the resist mask, the silicon oxide film 156 can be formed into an inverted taper shape by selecting etching. Thus, the first beam bodies 110 are obtained. It is noted that for description purposes, the number of first beam bodies 110 illustrated in this figure is different from the number of first beam bodies 110 illustrated in FIG. 1.

Figure 9D:
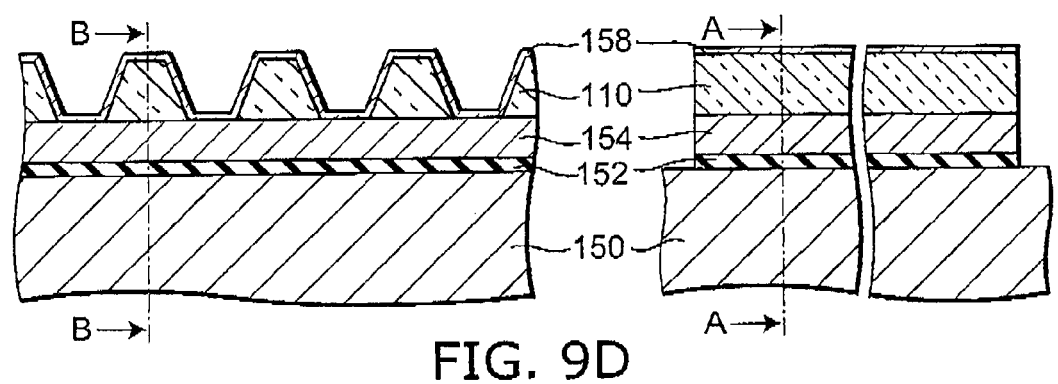

Next, as shown in FIG. 9D, a sacrificial layer 158 is deposited on the first beam bodies 110 and the exposed single crystal silicon layer 154. The sacrificial layer 158 can be illustratively made of Cr, and can be illustratively deposited by sputtering.

Figure 10A:
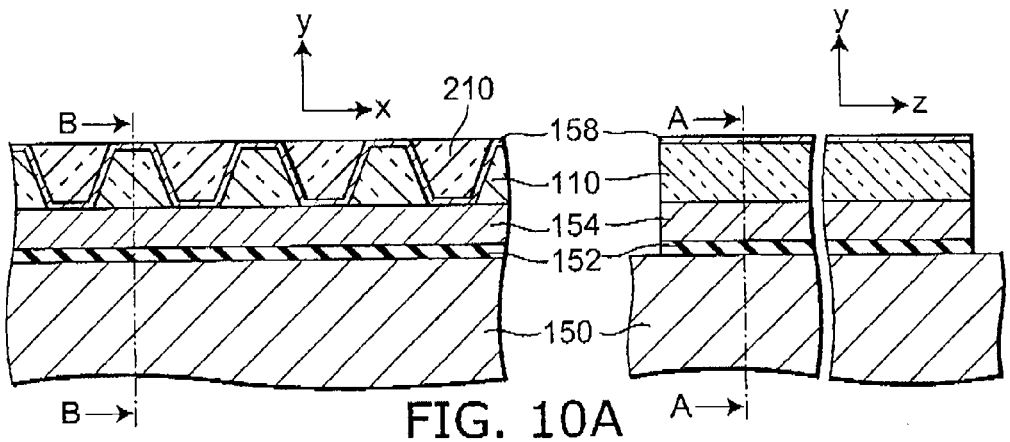
FIGS. 10A to 10D are schematic cross-sectional views based on the process sequence subsequent to FIG. 9.

Next, as shown in FIG. 10A, a silicon oxide film (e.g., silicon dioxide film) is deposited again on the sacrificial layer 158, and its upper portion is planarized illustratively by CMP (chemical mechanical polishing) to form second beam bodies 210. That is, the silicon oxide film deposited at the second time is formed on the first beam bodies 110 formed at the first time and having a taper shape, and hence necessarily has an inverted taper shape. Thus, the second beam bodies 210 having the inverted taper shape can be formed between adjacent first beam bodies 110 having the taper shape. It is noted that for description purposes, the number of second beam bodies 210 illustrated in this figure is different from the number of second beam bodies 210 illustrated in FIG. 1.

Figure 10B:
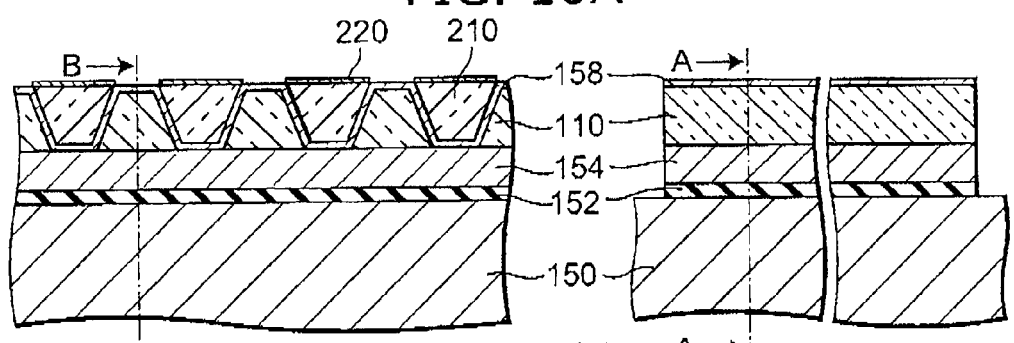

Next, as shown in FIG. 10B, a conductive material is deposited thereon, and a second electrode 220 is formed on the second beam body 210 by photolithography and etching. The conductive material can illustratively be Al or Au. A transparent electrode material such as ITO (indium tin oxide) and ZnO (zinc oxide) may also be used.

Figure 10C:
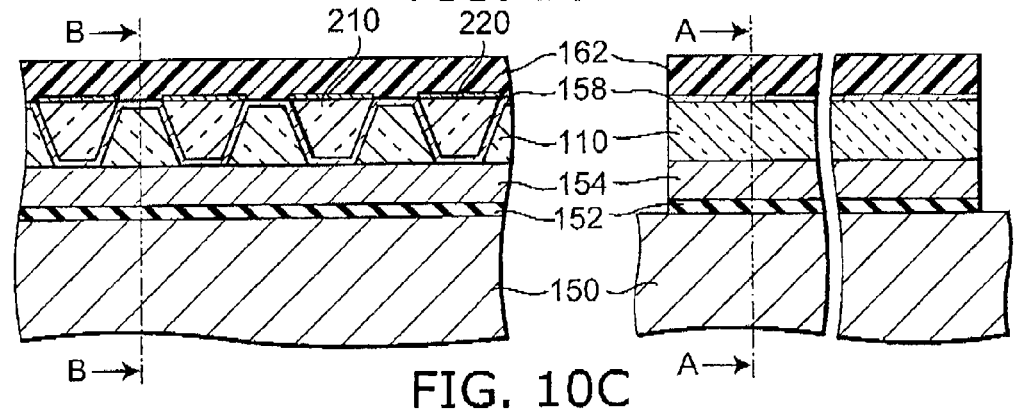

Next, as shown in FIG. 10C, a protective layer 162 is formed on the upper surface thereof. The protective layer 162 can be illustratively made of an organic material such as polyimide. It is also possible to bond a glass substrate.

Figure 10D:
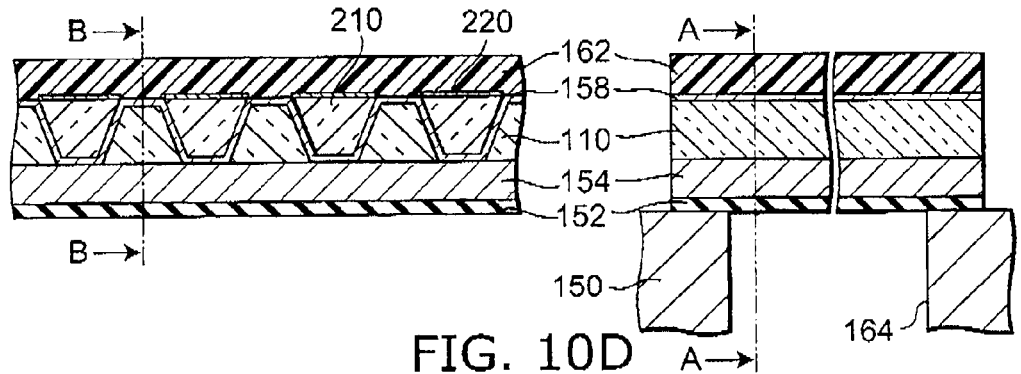

Next, as shown in FIG. 10D, a backside opening 164 is formed in the region of the substrate 150 corresponding to the first beam bodies 110 and the second beam bodies 210. Deep trenching of silicon constituting the substrate 150 can be illustratively performed by ICP (induction coupled plasma) etching. Here, the insulating layer 152, which is a BOX layer, serves as an etch stop layer.

Figure 11A:
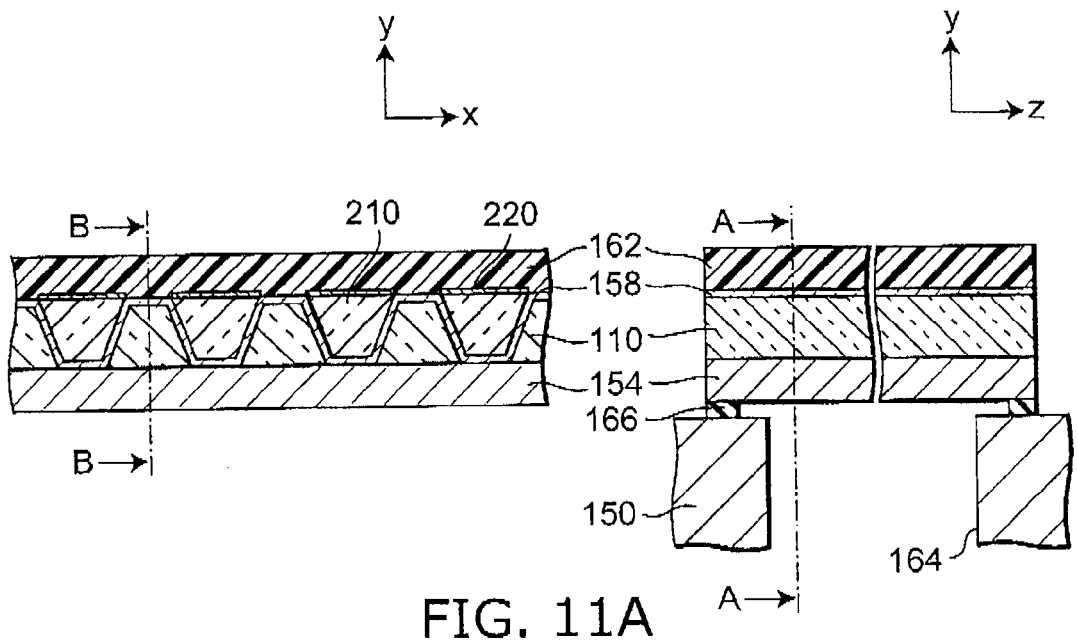
FIGS. 11A to 11C are schematic cross-sectional views based on the process sequence subsequent to FIG. 10.

Next, as shown in FIG. 11A, selective etching is performed on the insulating layer 152 exposed by the etching of the substrate 150 to form an anchor 166. Hydrofluoric acid, for example, can be used as an etchant. Alternatively, it is also possible to use a vapor etching technique in which vapor is used for etching.

Figure 11B:
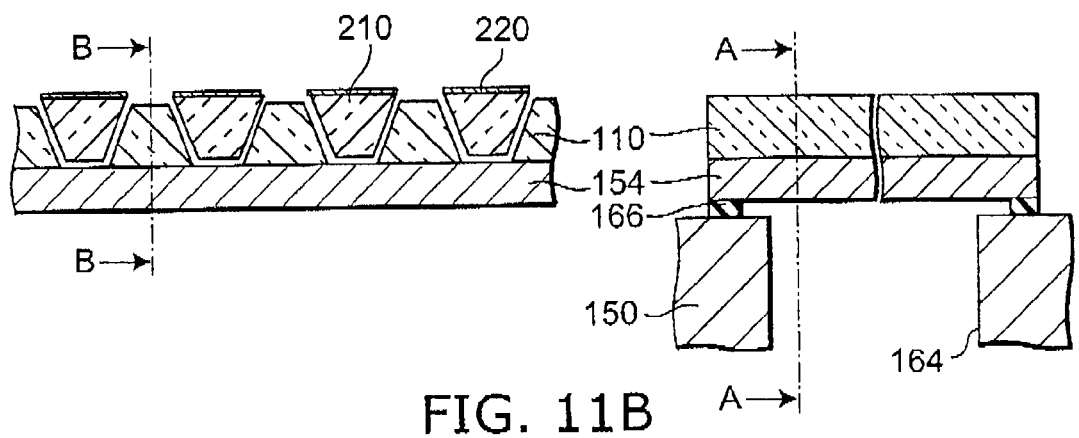

Next, as shown in FIG. 11B, the protective layer 162 and the sacrificial layer 158 are removed to separate the first beam body 110 and the second beam body 210. In the case where Cr is used for the sacrificial layer 158, the sacrificial layer 158 can be removed illustratively by hydrochloric acid.

Figure 11C:
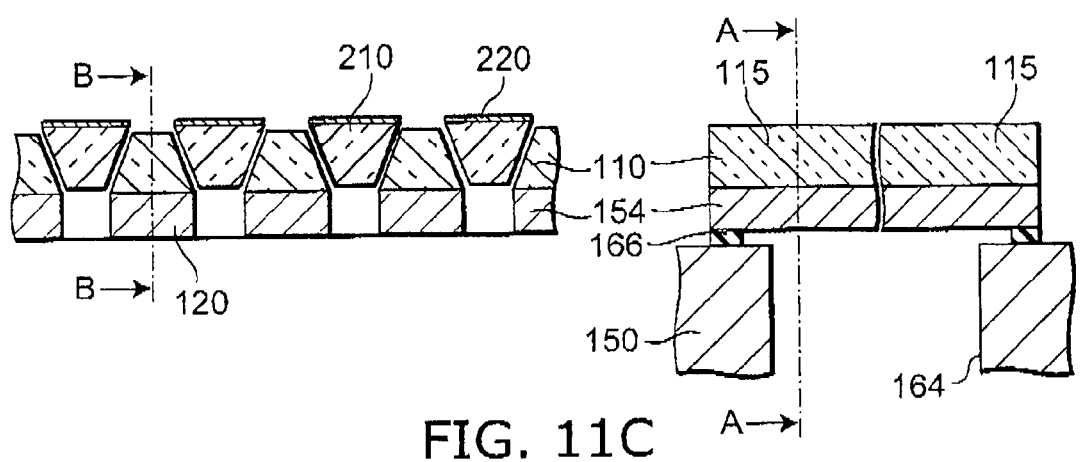

Then, as shown in FIG. 11C, the single crystal silicon layer 154 is separated off illustratively by $SF_6$ gas to separate the individual first beam bodies 110. The single crystal silicon layer 154 coupled to the lower surface of the first beam body 110 can be used as a first electrode 120. The end portion of the first beam body 110 near the anchor 166 serves as a first support section 115. Although not shown, likewise, the end portion of the second beam body 210 near the anchor 166 serves as a second support section 215.

Thus, the optical element 10 according to this embodiment illustrated in FIG. 1 can be formed.

In the manufacturing method illustrated above, the first electrode 120 is provided on the lower surface of the first beam body 110, and the second electrode 220 is provided on the upper surface of the second beam body 210. However, an electrode can be provided on at least one of the upper surface and the lower surface of each beam body in a method similar to the foregoing by changing the resist pattern used in photolithography.

The above manufacturing method can be used to form an optical element 10 in which first beam bodies 110 and second beam bodies 210 having a taper shape and an inverted taper shape, respectively, are alternately arranged. These beam bodies have electrodes, which can provide a potential difference across a gap. The electrostatic suction force produced thereby allows the beam bodies to be actuated by a direct or alternating current.

The optical element according to this embodiment can be fabricated on the basis of semiconductor microfabrication techniques, and the reproducibility of its configuration and the production yield can be improved. Furthermore, high control performance can be achieved in an optical system requiring wavelength-sized control.

As described above, this invention can provide an optical element with a variable spacing between beam bodies. The optical element allows a light source to be placed at a position nearly coplanar with the arranging direction of the beam bodies, and can be adapted to system downsizing.

Second Embodiment

The second embodiment of the invention relates to an optical device based on the optical element of the foregoing embodiment.

Figure 12:
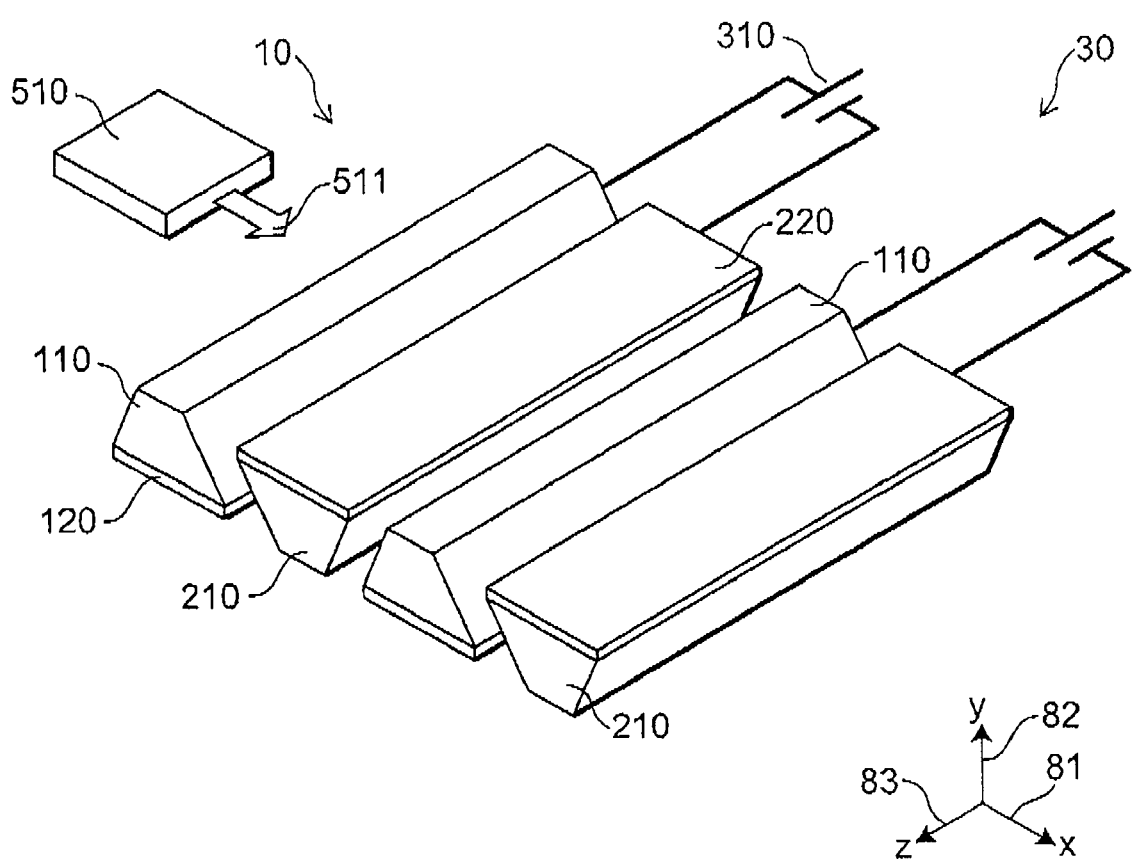
FIG. 12 is a schematic perspective view illustrating the main part of an optical device according to a second embodiment of the invention.

FIG. 12 is a schematic perspective view illustrating the main part of an optical device according to the second embodiment of the invention.

As shown in FIG. 12, the optical device 30 according to the second embodiment of the invention includes the optical element 10 according to the foregoing embodiment and a light source 510. The light 511 emitted from the light source 510 is incident on the optical element 10 from the x-axis direction (lateral direction), which is the arranging direction of the first beam bodies 110 and the second beam bodies 210 of the optical element 10. That is, the light source 510 can be provided in a plane effectively coplanar with the arranging direction (x-axis direction) of the first beam bodies 110 and the second beam bodies 210 of the optical element 10.

The light source 510 can illustratively be a semiconductor laser, LED (light emitting diode), or any of various lamps generating white light. Thus, in the optical device 30 according to this embodiment, the light source 510 and the optical element 10 can be provided in a generally coplanar configuration, and hence the device can be downsized.

That is, in the optical device 30 according to this embodiment, the light source can be placed on the lateral side of the optical element. Thus, this embodiment can realize a small and high-performance optical device.

It is noted that the first beam body 110 and the second beam body 210 of the optical element 10 are formed from a material which is effectively translucent to the light 511 emitted from the light source 510.

Although the optical element 10 is used in FIG. 12, the invention is not limited thereto. The above optical elements 11-21 and various modifications thereof can be used.

Third Embodiment

Figure 13:
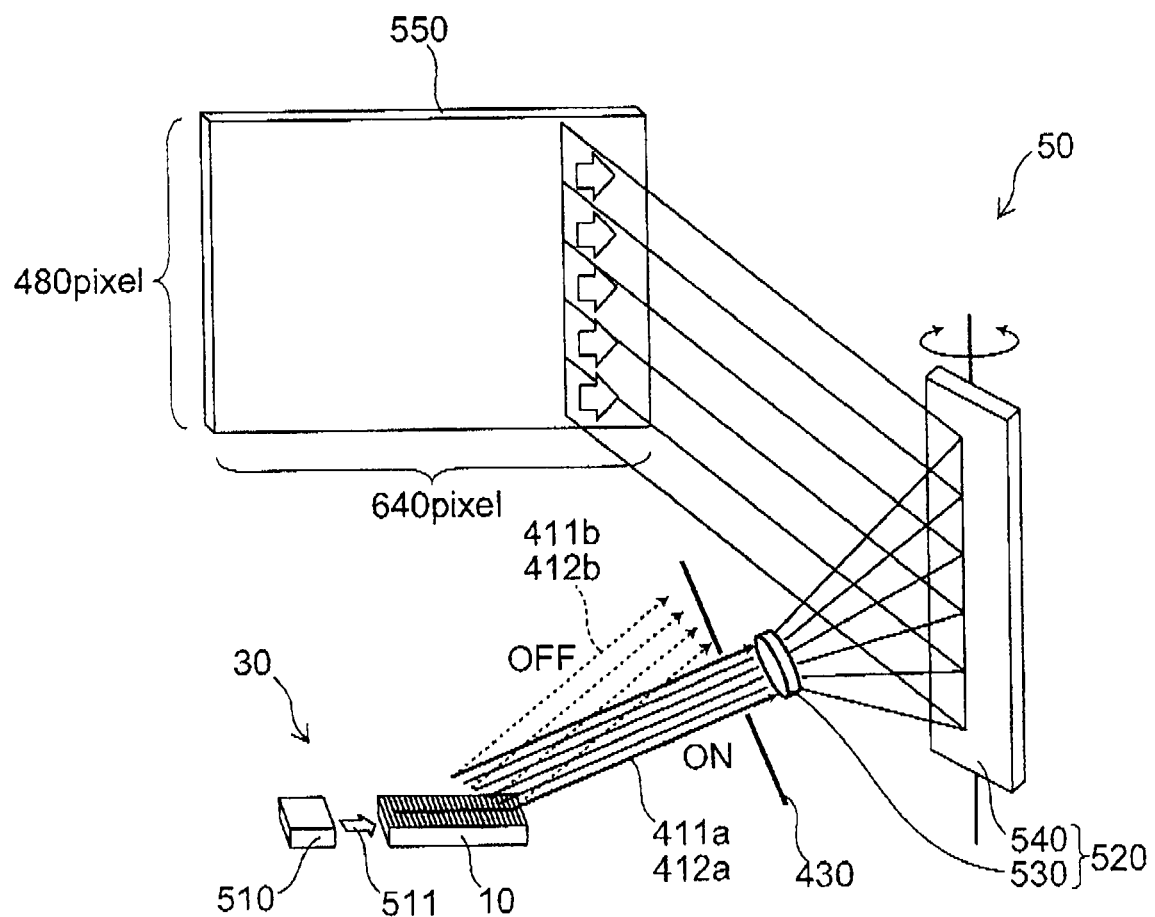
FIG. 13 is a schematic perspective view illustrating the configuration of a display device according to a third embodiment of the invention.

FIG. 13 is a schematic perspective view illustrating the configuration of a display device according to a third embodiment of the invention.

As shown in FIG. 13, the display device 50 according to the third embodiment of the invention includes the optical device 30 illustrated in FIG. 12, a slit (light extracting section) 430 provided on the optical device 30 for selectively extracting the diffracted light generated in one of the first state and the second state, and a projector 520 for projecting the extracted light.

In the optical device 30 of the display device 50, the light emitted from the light source 510 is incident on the optical element 10. The optical element 10 generates various diffracted light in the first state and the second state. The diffracted light in these different states is selectively extracted by the slit 430, expanded by an optical system 530, scanned by a galvano-mirror 540, and projected on a screen 550. That is, the optical system 530 and the galvano-mirror 540 serve as a projector 520 so that the diffracted light extracted through the slit 430 is projected on the screen 550. The projection on the screen 550 may be from the display surface side (front projection) or from the backside of the display surface (rear projection).

For example, in the case of a display having the number of pixels compatible with VGA (Video Graphics Array) composed of 480 vertical pixels and 640 horizontal pixels, the optical element 10 is provided with 480 groups (see FIG. 8) corresponding to the 480 vertical pixels. The spacing between beam bodies in each group is suitably varied as described above to modulate the light so that image information corresponding to the 480 vertical pixels can be simultaneously outputted. In the case of color display, a red (R), green (G), and blue (B) laser, for example, can be used as a light source. Alternatively, a color filter can be provided between the light source 510 and the optical element 10 to produce RGB light. It is also noted that the number of display pixels is not limited to VGA, but HDTV or higher-definition display can also be realized.

In the display device 50 according to this embodiment, the light source can be placed on the lateral side of the optical element. Thus, a small and high-performance display device can be realized.

Fourth Embodiment

Figure 14:
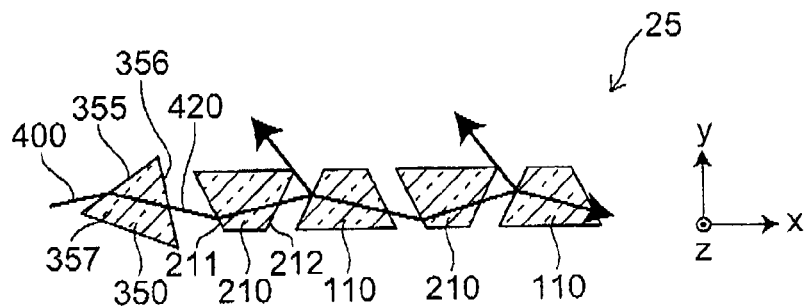
FIG. 14 is a schematic cross-sectional view illustrating the configuration of an optical element according to a fourth embodiment of the invention.

FIG. 14 is a schematic cross-sectional view illustrating the configuration of an optical element according to a fourth embodiment of the invention.

As shown in FIG. 14, the optical element 25 according to the fourth embodiment of the invention is different from the optical element 10 according to the first embodiment in further including a prism 350 (dispersion section). The prism 350 can be illustratively shaped like a triangular prism having a fifth plane 355, a sixth plane 356, and a seventh plane 357. The remaining configuration can be the same as that of the optical element 10, and hence the description thereof is omitted. It is noted that the prism 350 can be further provided in any of the optical elements 10-21 according to the first embodiment. In the following, a description is given of the optical element 25 having a configuration in which the prism 350 is combined with the optical element 10.

In the optical element 25 having such a configuration, the prism 350 serves to disperse the incident light 400, and the dispersed light 420 having a specific wavelength can be applied to the first beam body 110 and the second beam body 210. Thus, white light can be illustratively used as the incident light 400 to enable color display, for example.

The prism 350 can be provided in a plane effectively coplanar with the arranging direction (x-axis direction) of the first beam bodies 110 and the second beam bodies 210, and hence the downsizing can be maintained.

Figure 15:
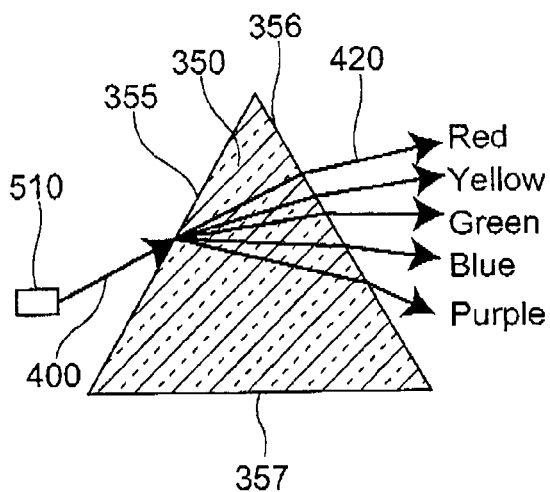
FIG. 15 is a schematic view illustrating the characteristics of the dispersion section that can be used in the optical element according to the fourth embodiment of the invention.

FIG. 15 is a schematic view illustrating the characteristics of the dispersion section that can be used in the optical element according to the fourth embodiment of the invention.

That is, this figure illustrates the optical characteristics of the prism 350.

As shown in FIG. 15, when the incident light 400 emitted from the white light source 510 is incident on the prism 350, it is decomposed into dispersed light 420 having various wavelengths, and the dispersed light 420 has a different traveling direction depending on its wavelength. This is because the direction of refraction depends on the wavelength when the incident light 400 is incident on the prism 350 from a direction oblique to the plane (the fifth plane 355 in this case) of the prism 350 made of a transparent medium (e.g., optical glass, or silicon oxide film such as silicon dioxide film) having a larger refractive index than the ambient space (e.g., vacuum, air, or other gas).

Figure 16:
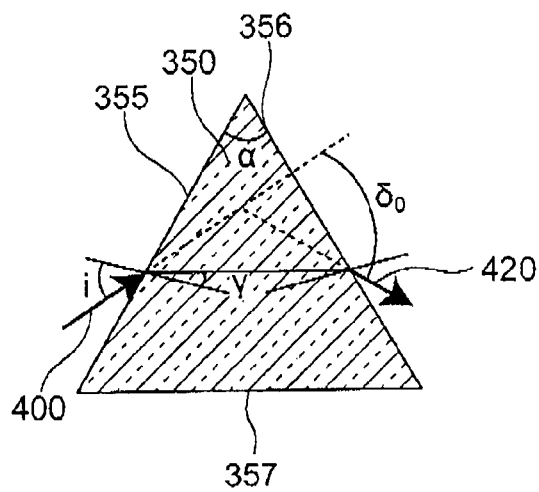
FIG. 16 is a schematic view illustrating the configuration of the dispersion section that can be used in the optical element according to the fourth embodiment of the invention.

FIG. 16 is a schematic view illustrating the configuration of the dispersion section that can be used in the optical element according to the fourth embodiment of the invention.

As shown in FIG. 16, in the prism 350, the angle formed between the fifth plane 355 and the sixth plane 356 is referred to as the vertex angle $\alpha$. The angle at which the incident light 400 is incident on the fifth plane 355 is referred to as the incidence angle i, and the angle at which it is emitted from the fifth plane 355 is referred to as the refraction angle $\gamma$. The angle that the direction of the incident light 400 makes with the direction of the light emitted from the prism 350 at the sixth plane after traveling in the prism 350 is referred to as the deflection angle $\delta_0$. The refractive index of the medium of the prism 350 is denoted by n. It is assumed that the refractive index of the ambient of the prism 350 is 1. Then, the following relation holds among the vertex angle $\alpha$, incidence angle i, refraction angle $\gamma$, deflection angle $\delta_0$, and refractive index n:

$$n = \frac{\sin i}{\sin \gamma} = \frac{\sin\left(\frac{\delta_0 + \alpha}{2}\right)}{\sin\left(\frac{\alpha}{2}\right)} \quad (2)$$

As expressed in the above equation, if the vertex angle $\alpha$ of the prism 350 and the deflection angle $\delta_0$ for monochromatic light are thus defined, the refractive index n of the prism 350 for that wavelength is derived. Hence, the light beam emitted from the prism 350 has an angle depending on the wavelength.

This principle is applied, as illustrated in FIG. 14, to combine the prism 350 with the first beam bodies 110 and the second beam bodies 210 so that the plane of the prism 350 is illustratively inclined from the x-axis direction. Thus, the dispersed light 420 having a desired wavelength can be applied to the first beam body 110 and the second beam body 210, and guided therethrough in the x-axis direction. That is, light having an arbitrary wavelength can be extracted from the light of the white light source 510 by placing the plane of the prism 350 at an adapted angle with respect to the x-axis direction.

FIG. 17 is a schematic view illustrating the operation of the optical element according to the fourth embodiment of the invention.

Figure 17A:
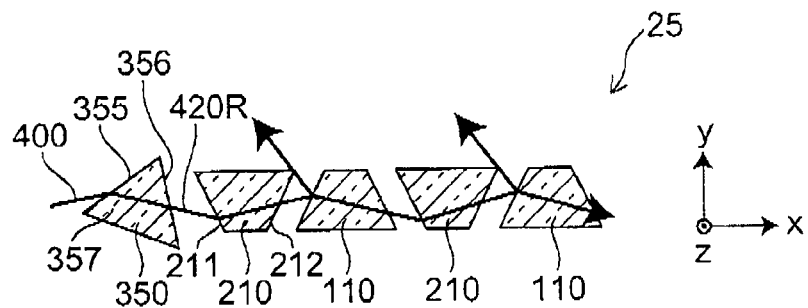
FIGS. 17A to 17C are schematic views illustrating the operation of the optical element according to the fourth embodiment of the invention.
Figure 17B:
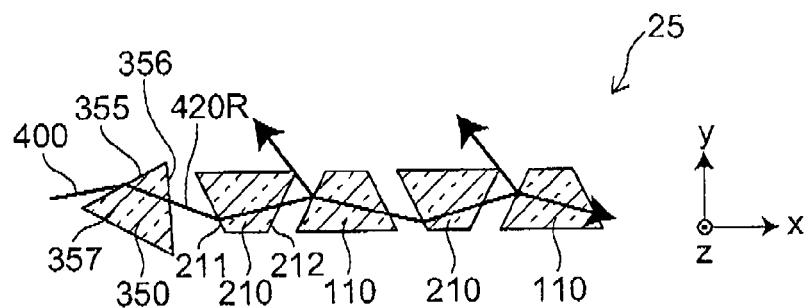
Figure 17C:
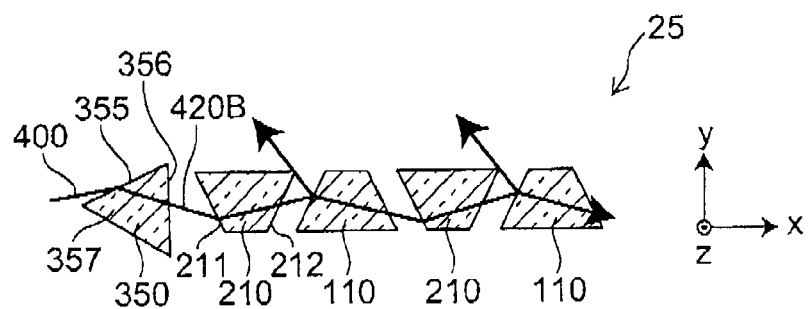

More specifically, FIGS. 17A to 17C show three states with different angles of the prism 350 used in the optical element.

As shown in FIG. 17A, in the case where the angle of the prism 350 is set to a first angle, the red light 420R having a red wavelength (e.g., 600 to 750 nm) is illustratively incident on the first beam body 110 and the second beam body 210 and guided therethrough. The light having the other wavelengths is not incident on the first beam body 110 and the second beam body 210, or even if it is incident thereon, it is not guided a long distance and, as described earlier, not extracted by the slit 430, for example. Consequently, when the prism 350 is set to the first angle, only the red light 420R is extracted and used.

As shown in FIG. 17B, in the case where the angle of the prism 350 is set to a second angle, the green light 420G having a green wavelength (e.g., 500 to 560 nm) is illustratively incident on the first beam body 110 and the second beam body 210 and guided therethrough. Furthermore, likewise, only the green light 420G is extracted and used.

As shown in FIG. 17C, in the case where the angle of the prism 350 is set to a third angle, the blue light 420B having a blue wavelength (e.g., 435 to 480 nm) is illustratively incident on the first beam body 110 and the second beam body 210 and guided therethrough. Furthermore, likewise, only the blue light 420B is extracted and used.

Thus, by varying the angle of the prism 350, light having the three primary colors can be guided, extracted, and used with controlled intensity.

Thus, the optical element 25 according to this embodiment allows a light source to be placed on the lateral side of the optical element and can be adapted to system downsizing. Furthermore, the optical element can extract and use an arbitrary wavelength from a white light source.

It is noted that the above prism 350 can be fabricated simultaneously in the process of, for example, fabricating the first beam body 110 and the second beam body 210. The angle of the plane of the prism 350 with respect to the arranging direction (e.g., x-axis direction) of the first beam bodies 110 and the second beam bodies 210 can be illustratively controlled by electrostatic force based on the potential applied to the electrodes (not shown) or the like provided on the prism 350. Besides electrostatic force, electromagnetic force may be used for control. By sequentially varying the angle of the prism 350 from the first to third angle in the course of time, light having different wavelengths can be controlled in a time division manner and, as described later, can be applied to a display device capable of color display.

The prism 350 may be separately fabricated in a process different from the process of fabricating the first beam body 110 and the second beam body 210, and combined with the optical element.

Figure 18:
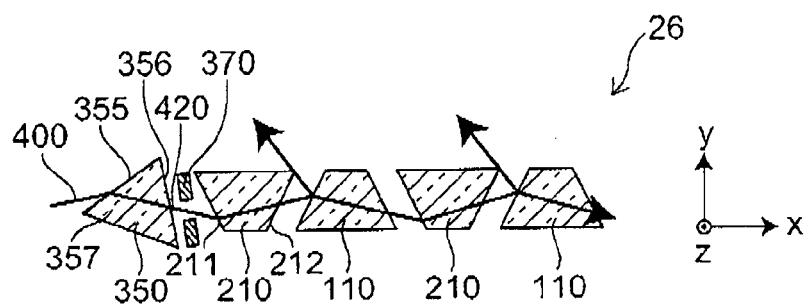
FIG. 18 is a schematic cross-sectional view illustrating the configuration of another optical element according to the fourth embodiment of the invention.

FIG. 18 is a schematic cross-sectional view illustrating the configuration of another optical element according to the fourth embodiment of the invention.

As shown in FIG. 18, another optical element 26 according to the fourth embodiment of the invention is different from the optical element 25 in further including a slit 370 between the prism 350, and the first beam bodies 110 and the second beam bodies 210. The remaining configuration can be the same as that of the optical element 25, and hence the description thereof is omitted.

This configuration serves to improve resolution characteristics in extracting the dispersed light 420.

It is noted that also in this case, the prism 350 and the slit 370 can be further provided in any of the optical elements 10-21 according to the first embodiment.

Furthermore, although a prism 350 is used as a dispersion section in the foregoing, the dispersion section can be based on any structures, such as a grating, capable of dispersing the incident light 400. Also in such cases, the same effect can be achieved, and the structure can also be combined with the slit 370.

Fifth Embodiment

The fifth embodiment of the invention relates to an optical device based on the optical element of the embodiment of the invention.

FIG. 19 is a schematic perspective view illustrating the configuration of an optical device according to the fifth embodiment of the invention.

Figure 19A:
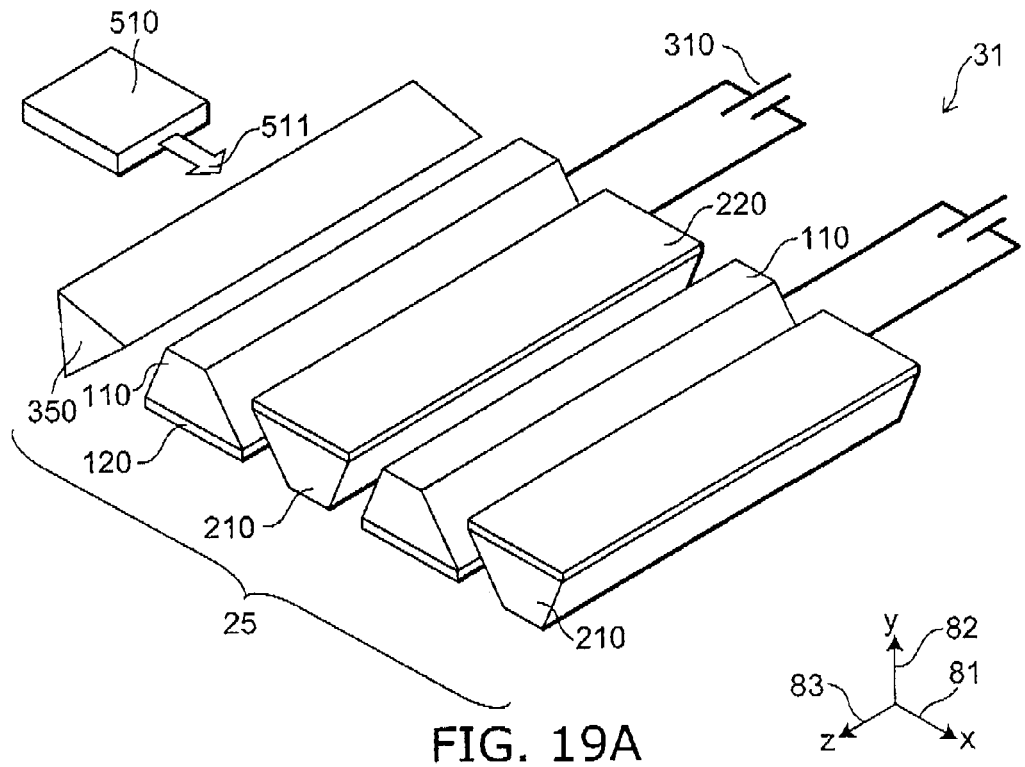
FIGS. 19A and 19B are schematic perspective views illustrating the configuration of an optical device according to the fifth embodiment of the invention.

As shown in FIG. 19A, the optical device 31 according to the fifth embodiment of the invention includes the optical element 25 according to the fourth embodiment and a light source 510. The light 511 emitted from the light source 510 is incident on the prism 350 of the optical element 25 from the x-axis direction (lateral direction), which is the arranging direction of the first beam bodies 110 and the second beam bodies 210 of the optical element 25. Here, the light source 510 can be provided in a plane effectively coplanar with the arranging direction (x-axis direction) of the first beam bodies 110 and the second beam bodies 210 of the optical element 25.

The light source 510 can illustratively be a semiconductor laser, LED, or any of various lamps generating white light. Thus, in the optical device 31 according to this embodiment, the light source 510 and the optical element 25 can be provided in a generally coplanar configuration, and hence the device can be downsized. Furthermore, various wavelengths from the white light source 510 can be used for control with varied light intensity.

That is, in the optical device 31 according to this embodiment, the light source can be placed on the lateral side of the optical element. Thus, this embodiment can realize a small and high-performance optical device, which further facilitates application to color display.

It is noted that the first beam body 110 and the second beam body 210 and the prism 350 of the optical element 25 are made of a material which is effectively translucent to the light 511 emitted from the light source 510.

Although the optical element 25 is used in this example, the invention is not limited thereto. The above optical elements 25, 26 and various modifications thereof can be used.

Figure 19B:
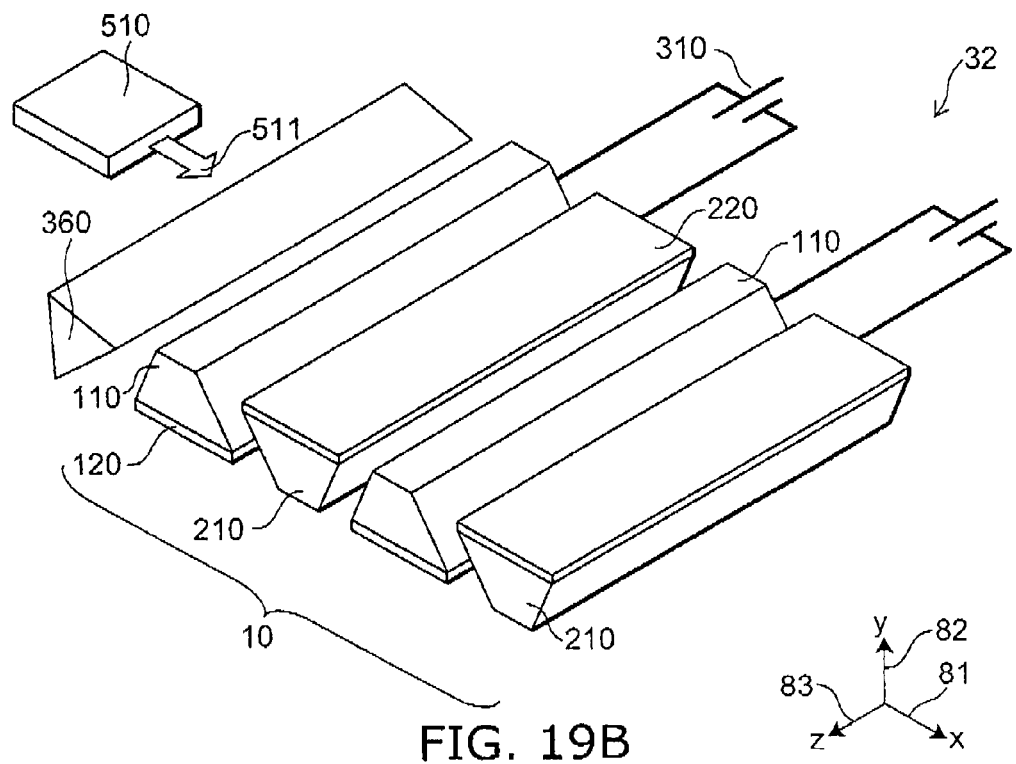

As shown in FIG. 19B, another optical device 32 according to the fifth embodiment of the invention includes the optical element 10 according to the first embodiment, a light source 510, and a prism 360 (dispersion section) provided between the optical element 10 and the light source 510. The prism 360 can be the same as the prism 350 described previously. The operation and function thereof can also be the same. That is, the optical device 32 includes a light source 510 and a prism 360 besides the optical element 10. It is noted that the prism 360 can be provided generally coplanar with the optical element 10, and hence the downsizing can be maintained. The prism 360 may be replaced by a grating or the like.

Also in this case, the light 511 emitted from the light source 510 is incident, through the prism 360, on the optical element 10 from the x-axis direction (lateral direction), which is the arranging direction of the first beam bodies 110 and the second beam bodies 210 of the optical element 10. Here, the light source 510 can be provided in a plane effectively coplanar with the arranging direction (x-axis direction) of the first beam bodies 110 and the second beam bodies 210 of the optical element 10.

Also in this case, the light source 510 can illustratively be a semiconductor laser, LED, or any of various lamps generating white light. Thus, in the optical device 32 according to this embodiment, the light source 510 and the optical element 10 can be provided in a generally coplanar configuration, and hence the device can be downsized. Furthermore, various wavelengths from the white light source 510 can be used for control with varied light intensity.

That is, in the optical device 32 according to this embodiment, the light source can be placed on the lateral side of the optical element. Thus, this embodiment can realize a small and high-performance optical device, which further facilitates application to color display.

It is noted that the first beam body 110 and the second beam body 210 of the optical element 10 and the prism 360 can be made of a material which is effectively translucent to the light 511 emitted from the light source 510.

Although the optical element 10 is used in this example, the invention is not limited thereto. The optical elements 10-21 according to the first embodiment and various modifications thereof can be used. Furthermore, a slit may be provided between the prism 360, and the first beam bodies 110 and the second beam bodies 210.

Sixth Embodiment

Figure 20:
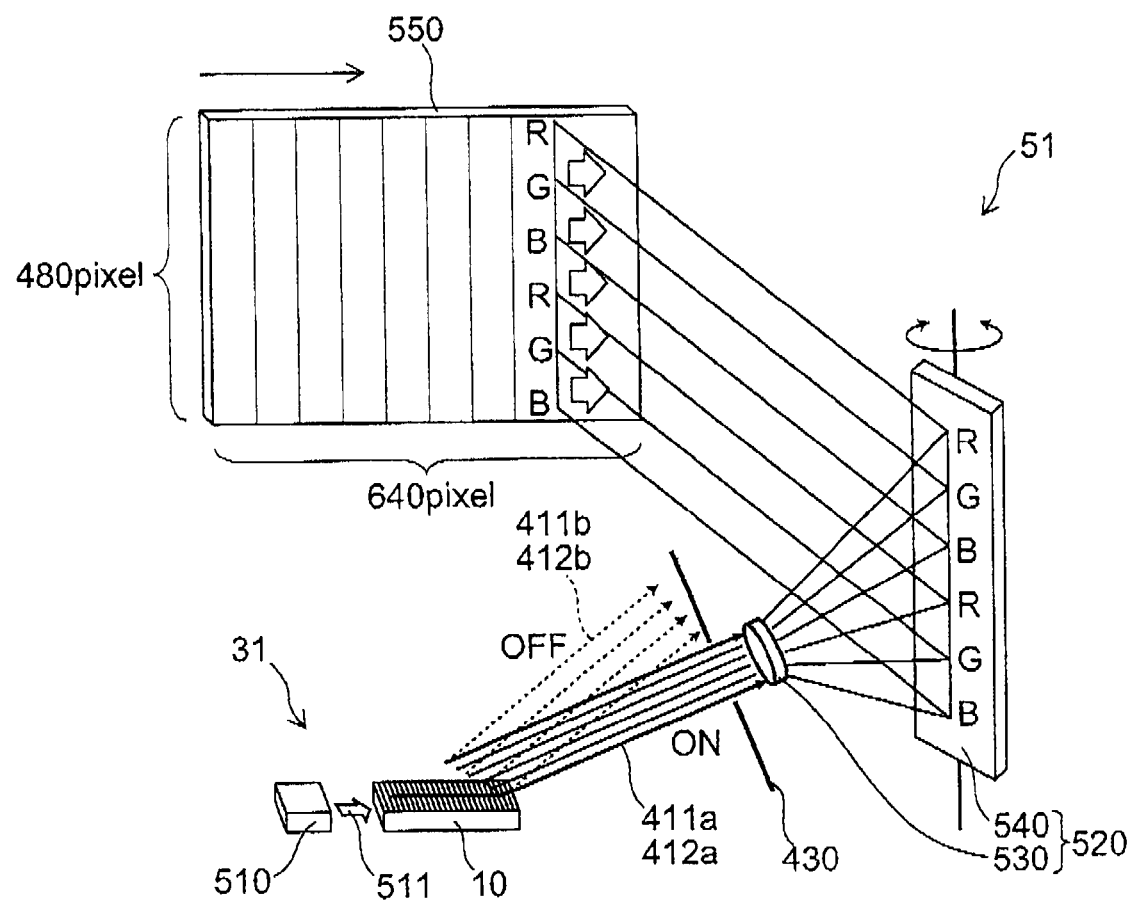
FIG. 20 is a schematic perspective view illustrating the configuration of a display device according to a sixth embodiment of the invention.

FIG. 20 is a schematic perspective view illustrating the configuration of a display device according to a sixth embodiment of the invention.

As shown in FIG. 20, the display device 51 according to the sixth embodiment of the invention includes the optical device 31, a slit (light extracting section) 430 provided on the optical device 31 for selectively extracting the diffracted light generated in one of the first state and the second state, and a projector 520 for projecting, the extracted light.

It is noted that the optical device 31 may be replaced by the optical device 32. That is, the optical device can be made of the light source 510, the optical element 10 including the first beam bodies 110 and the second beam bodies 210, and the prism 360 (dispersion section) provided between the light source 510 and the optical element 10. Furthermore, a slit may be provided between the prism 350 (or prism 360), and the first beam bodies 110 and the second beam bodies 210.

In the optical device 31 of the display device 51, the light emitted from the light source 510 is incident on the optical element 25. That is, the light is incident on the prism 350, and the dispersed light 420 having a specific wavelength emitted from the prism 350 is incident on the first beam bodies 110 and the second beam bodies 210. Thus, various diffracted light is generated in the first state and the second state. The diffracted light in these different states is selectively extracted by the slit 430, expanded by an optical system 530, scanned by a galvano-mirror 540, and projected on a screen 550. That is, the optical system 530 and the galvano-mirror 540 serve as a projector 520 so that the diffracted light extracted through the slit 430 is projected on the screen 550. The projection on the screen 550 may be from the display surface side (front projection) or from the backside of the display surface (rear projection).

Here, as illustrated in FIG. 17, the light source 510 can be a white light source such as a Hg lamp, and semiconductor lasers or LEDs having different wavelengths or those used in combination with phosphors. The angle of the prism 350 can be set to the first to third angle so that light having the three primary colors, such as the red light 420R, the green light 420G, and the blue light 420B, is guided as the diffracted light 420, and extracted with controlled intensity. The angle of the prism 350 can be varied in a time division manner in accordance with each signal of the three primary colors of a video display signal, and the galvano-mirror 540 is synchronized with the video display signal. Thus, a color video image can be obtained on the screen 550.

That is, the display device 51 according to this embodiment can display a full-color video image using only a white light source, and the light source can be placed on the lateral side of the optical element. Thus, a small and high-performance display device can be realized.

The embodiments of the invention have been described with reference to examples, However, the invention is not limited to these examples. For instance, any specific configurations of the components constituting the optical element, the optical device, and the display device are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible, and such combinations are also encompassed within the scope of the invention as long as they fall within the spirit of the invention.

Furthermore, those skilled in the art can suitably modify and implement the optical element, the optical device, and the display device described above in the embodiments of the invention, and any optical elements, optical devices, and display devices thus modified are also encompassed within the scope of the invention as long as they fall within the spirit of the invention.

Furthermore, those skilled in the art can conceive various modifications and variations within the spirit of the invention, and it is understood that such modifications and variations are also encompassed within the scope of the invention.

The invention claimed is:

1. An optical element comprising:
   a plurality of first beam bodies arranged in a first direction on a first plane and being parallel to each other; and
   a plurality of second beam bodies, each of the second beam bodies being placed between adjacent ones of the first beam bodies and provided parallel to the first beam bodies, wherein,
   each of the first beam bodies has side surfaces which face the second beam bodies adjacent thereto and are sloped so that a width of the each of the first beam bodies in the first direction gradually decreases to an upward direction perpendicular to the first plane,
   each of the second beam bodies has side surfaces which face the first beam bodies adjacent thereto and are sloped so that a width of the each of the second beam bodies in the first direction gradually increases to the upward direction, and as viewed in the first direction, a spacing between one of the first beam bodies and one of the second beam bodies adjacent to the one of the first beam bodies being adjustable.

2. The element according to claim 1, wherein the optical element can selectively form:
a first state in which the arrangement of the first and second beam bodies as viewed in the first direction has a first period, and
a second state in which the arrangement of the first and second beam bodies as viewed in the first direction has a second period that is different from the first period.

3. The element according to claim 2, wherein one of the first period and the second period is half the other.

4. The element according to claim 2, wherein in one of the first state and the second state, the first beam bodies and the second beam bodies are equidistantly arranged as viewed in the first direction.

5. The element according to claim 4, wherein in the other of the first state and the second state, the first beam bodies and the second beam bodies are arranged so that a first spacing and a second spacing that is different from the first spacing alternately occur as viewed in the first direction.

6. The element according to claim 2, wherein adjacent ones of the first beam bodies and the second beam bodies come close to each other when transition is made from one of the first state and the second state to the other.

7. The element according to claim 2, wherein in one of the first state and the second state, electrostatic suction force acts between adjacent ones of the first beam bodies and the second beam bodies.

8. The element according to claim 1, wherein,
each of the first beam bodies has a first electrode,
each of the second beam bodies has a second electrode that is different from the first electrode, and
the first electrode and the second electrode can be subjected to mutually different potentials.

9. The element according to claim 1, wherein each of the first beam bodies and each of the second beam bodies include silicon oxide.

10. The element according to claim 1, wherein,
a support section is connected to at least one of the ends of each of the first beam bodies and the second beam bodies, and
part of the support section is fixed to a common member.

11. The element according to claim 10, wherein,
the support section includes silicon,
the common member is a silicon substrate, and
the support section is fixed to the silicon substrate through a silicon oxide film.

12. The element according to claim 1, further comprising:
a dispersion section including one of a prism and a grating configured to apply dispersed light to the first beam bodies and the second beam bodies.

13. The element according to claim 12, wherein,
the dispersion section is a prism, and
an angle of a plane of the prism on which the light is incident, the angle being formed with respect to the first direction of the first beam bodies and the second beam bodies, is variable.

14. An optical device comprising:
a light source; and
an optical element on which light emitted from the light source is incident,
the optical element including:
a plurality of first beam bodies arranged in a first direction on a first plane and being parallel to each other; and
a plurality of second beam bodies, each of the second beam bodies being placed between adjacent ones of the first beam bodies and provided parallel to the first beam bodies, wherein,
each of the first beam bodies has side surfaces which face the second beam bodies adjacent thereto and are sloped so that a width of the each of the first beam bodies in the first direction gradually decreases to an upward direction perpendicular to the first plane,
each of the second beam bodies has side surfaces which face the first beam bodies adjacent thereto and are sloped so that a width of the each of the second beam bodies in the first direction gradually increases to the upward direction, and
as viewed in the first direction, a spacing between one of the first beam bodies and one of the second beam bodies adjacent to the one of the first beam bodies being adjustable.

15. The device according to claim 14, wherein the light source is provided in a plane effectively coplanar with the first direction of the first beam bodies and the second beam bodies of the optical element.

16. The device according to claim 14, wherein each of the first beam bodies and each of the second beam bodies of the optical element are made of a material translucent to the light emitted from the light source.

17. An optical device comprising:
a light source;
an optical element juxtaposed with the light source,
the optical element including:
a plurality of first beam bodies arranged in a first direction on a first plane and being parallel to each other; and
a plurality of second beam bodies, each of the second beam bodies being placed between adjacent ones of the first beam bodies and provided parallel to the first beam bodies, wherein,
each of the first beam bodies has side surfaces which face the second beam bodies adjacent thereto and are sloped so that a width of the each of the first beam bodies in the first direction gradually decreases to an upward direction perpendicular to the first plane,
each of the second beam bodies has side surfaces which face the first beam bodies adjacent thereto and are sloped so that a width of the each of the second beam bodies in the first direction gradually increases to the upward direction, and
as viewed in the first direction, a spacing between one of the first beam bodies and one of the second beam bodies adjacent to the one of the first beam bodies being adjustable; and
a dispersion section provided between the light source and the optical element, the dispersion section being configured so that light emitted from the light source is dispersed in a time division manner and applied to the optical element.

18. A display device comprising:
an optical device including:
a light source; and
an optical element on which light emitted from the light source is incident,
the optical element including:

a plurality of first beam bodies arranged in a first direction on a first plane and being parallel to each other; and a plurality of second beam bodies, each of the second beam bodies being placed between adjacent ones of the first beam bodies and provided parallel to the first beam bodies, wherein, each of the first beam bodies has side surfaces which face the second beam bodies adjacent thereto and are sloped so that a width of the each of the first beam bodies in the first direction gradually decreases to an upward direction perpendicular to the first plane, each of the second beam bodies has side surfaces which face the first beam bodies adjacent thereto and are sloped so that a width of the each of the second beam bodies in the first direction gradually increases to the upward direction, and as viewed in the first direction, a spacing between one of the first beam bodies and one of the second beam bodies adjacent to the one of the first beam bodies being adjustable;

an optical mechanism provided on the optical device, the optical mechanism being configured to selectively extract diffracted light generated in one of a first state and a second state; and a projection mechanism configured so that the diffracted light extracted by the optical mechanism is projected on a screen.

19. A display device comprising:
an optical device including:
a light source; and
an optical element juxtaposed with the light source,
the optical element including:
a plurality of first beam bodies arranged in a first direction on a first plane and being parallel to each other;
a plurality of second beam bodies, each of the second beam bodies being placed between adjacent ones of the first beam bodies and provided parallel to the first beam bodies; and
a dispersion section made of a prism having a plane whose angle with respect to the first direction is variable, the dispersion section being configured so that light emitted from the light source is dispersed and applied to the first beam bodies and the second beam bodies, wherein, each of the first beam bodies has side surfaces which face the second beam bodies adjacent thereto and are sloped so that a width of the each of the first beam bodies in the first direction gradually decreases to an upward direction perpendicular to the first plane, each of the second beam bodies has side surfaces which face the first beam bodies adjacent thereto and are sloped so that a width of the each of the second beam bodies in the first direction gradually increases to the upward direction, and as viewed in the first direction, a spacing between one of the first beam bodies and one of the second beam bodies adjacent to the one of the first beam bodies being adjustable;

an optical mechanism provided on the optical device, the optical mechanism being configured to selectively extract diffracted light generated in one of a first state and a second state; and a projection mechanism configured so that the diffracted light extracted by the optical mechanism is projected on a screen in synchronization with timing of variation of the angle of the plane of the dispersion section.

20. A display device comprising:
an optical device including:
a light source;
an optical element juxtaposed with the light source,
the optical element including:
a plurality of first beam bodies arranged in a first direction on a first plane and being parallel to each other; and
a plurality of second beam bodies, each of the second beam bodies being placed between adjacent ones of the first beam bodies and provided parallel to the first beam bodies, wherein, each of the first beam bodies has side surfaces which face the second beam bodies adjacent thereto and are sloped so that a width of the each of the first beam bodies in the first direction gradually decreases to an upward direction perpendicular to the first plane, each of the second beam bodies has side surfaces which face the first beam bodies adjacent thereto and are sloped so that a width of the each of second beam bodies in the first direction gradually increases to the upward direction, and as viewed in the first direction, a spacing between one of the first beam bodies and one of the second beam bodies adjacent to the one of the first beam bodies being adjustable;

a dispersion section provided between the light source and the optical element, the dispersion section being configured so that light emitted from the light source is dispersed in a time division manner and applied to the optical element;

an optical mechanism provided on the optical device, the optical mechanism being configured to selectively extract diffracted light generated in one of a first state and a second state; and a projection mechanism configured so that the diffracted light extracted by the optical mechanism is projected on a screen in synchronization with timing of the time division.

* * * * *